United States Patent [19]

Oertel et al.

[11] 4,153,596

[45] May 8, 1979

[54] PERMANENTLY STABILIZED POLYMERS PRODUCED BY AFTER-TREATMENT WITH PIPERIDINE COMPOUNDS

[75] Inventors: Harald Oertel, Odenthal; Paul Uhrhan; Reinhard Lantzsch, both of Cologne; Ernst Roos, Odenthal; Dieter Arlt, Cologne; Hans Schröer, Dormagen, all of Fed. Rep. of Germany

[73] Assignee: Bayer Aktiengesellschaft, Leverkusen, Fed. Rep. of Germany

[21] Appl. No.: 834,764

[22] Filed: Sep. 19, 1977

[30] Foreign Application Priority Data

Sep. 21, 1976 [DE] Fed. Rep. of Germany ....... 2642461

[51] Int. Cl.$^2$ ..................... C08G 18/38; C08G 69/48; C08G 63/76; C08F 6/26
[52] U.S. Cl. ............................... 260/45.8 N; 106/125; 521/164; 526/9; 528/46; 528/47; 528/73; 528/333; 528/370
[58] Field of Search ................... 260/45.8 N, 77.5 SS; 528/73, 47, 46, 333, 370; 526/9; 106/125; 521/164

[56] References Cited

U.S. PATENT DOCUMENTS

| | | |
|---|---|---|
| 3,640,928 | 2/1972 | Murayama et al. ............ 260/45.8 N |
| 3,984,371 | 10/1976 | Murayama et al. ........... 260/77.5 SS |
| 3,992,390 | 11/1976 | Holt et al. ...................... 260/45.8 N |

*Primary Examiner*—H. S. Cockeram
*Attorney, Agent, or Firm*—Plumley and Tyner

[57] ABSTRACT

This invention relates to permanently stabilized polymers containing substituted piperidine derivatives chemically attached to the polymer molecule through O- or N-atoms. Compounds based on 2,2,6,6-tetraalkyl piperidines have now been found which, on the one hand, have a very high stabilizing activity and, on the other hand, contain one or more reactive groups through which they are able to react with the polymers to be stabilized. Stabilized polymers, preferably polyurethane elastomer filaments, films and coatings with a permanent washing-resistant, boiling resistant, acid-resistant, dry-cleaning-resistant and solvent-resistant stabilization based on 2,2,6,6-tetraalkyl piperidine light stabilizers are thus obtained.

10 Claims, No Drawings

PERMANENTLY STABILIZED POLYMERS PRODUCED BY AFTER-TREATMENT WITH PIPERIDINE COMPOUNDS

This invention relates to permanently stabilised polymers containing substituted piperidine derivatives chemically attached to the polymer molecule through O- or N-atoms.

Derivatives of 2,2,6,6-tetraalkyl piperidines are known. Some of them have recently proved to be particularly suitable for stabilising polymers. Some representatives of this series have been found to be particularly effective in polyurethanes, reducing both the extent to which the polyurethanes are discoloured and also their loss of strength on exposure to light (sunlight or UV-light).

However, it has been found that the stabilisation of polymers, especially polyurethane elastomer filaments or polyurethane coatings, with derivatives of 2,2,6,6-tetraalkyl piperidines loses its effectiveness surprisingly quickly, for example when the filaments or coatings are treated with dry cleaning solvents or when they are dyed in (normally) weakly acidic dye baths. In addition, dyeing is accompanied by considerable disturbances in dyeing behaviour. For example, only part of the dye is normally attached to the fibre, the rest being kept in solution in the form of a "dye salt" of the basic tetraalkyl piperidine derivative and the acid groups of the dye, or forming a non-abrasion-resistant deposit on the surface of the fibres. When PU-elastomer filaments or elastomer films which, for example, have been extracted with solvents or boiled with acetic acid solutions ("blank dyeing") are exposed to light, the stabilising effect substantially or completely disappears.

However, extraction-resistant stabilisation is required for numerous polymer applications, especially for shaped articles with a large surface area, as is particularly the case with filaments and fibres and also with films, coatings and microporous films (artificial leather).

Compounds based on 2,2,6,6-tetraalkyl piperidines have now been found which, on the one hand, have a very high stabilising activity and, on the other hand, contain one or more reactive groups through which they are able to react with the polymers to be stabilised. Stabilised polymers, preferably polyurethane elastomer filaments, films and coatings with a permanent washing-resistant, boiling resistant, acid-resistant, dry-cleaning-resistant and solvent-resistant stabilisation based on 2,2,6,6-tetraalkyl piperidine light stabilisers are thus obtained.

It is therefore an object of the present invention to provide permanently stabilized polymers having stabilizing radicals attached to O- or N-atoms, said radicals corresponding to the general formulas (I-A)

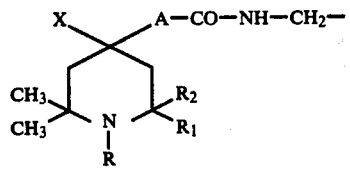

(I - A)

in which
R represents hydrogen, a straight-chain or branched alkyl radical with 1 to 20 carbon atoms, an alkenyl radical with 3 to 5 carbon atoms, an aralkyl radical with 7 to 12 carbon atoms, the group —CH—CH-$R_6$—OH, where $R_6$ represents hydrogen, methyl or phenyl, the group —$CH_2$—$CH_2$—CN, the group —$CH_2$—$CH_2$—COOalkyl or the group —$CH_2$—CH—COOalkyl,
$CH_3$ $R_1$ and $R_2$, which may be the same or different, each represents a straight-chain or branched alkyl radical with 1 to 6 carbon atoms, $R_1$ and $R_2$ together with the ring carbon atom to which they are attached, form a cycloalkyl ring with 5 to 7 carbon atoms, $R_3'$
—A— represents
(a) —N—E—
(b) —O—E—, or
(c) —CO—NH—NH—;
in case (a), X in the general formula (I-A) represents hydrogen, in case (b), X represents hydrogen, the cyano group or a —$COOR_7$-group, where $R_7$ represents an alkyl radical, preferably a methyl or ethyl radical, and in case (c), X represents the OH-group, and $R_3'$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonyl alkyl radical preferably containing from 1 to 3 carbon atoms in the alkoxy moiety, an aryl radical with 6 to 10 carbon atoms, the group —$CH_2$—CH($R_6$)—OH (where $R_6$ represents hydrogen, methyl or phenyl), the group:

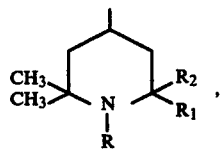

the group:

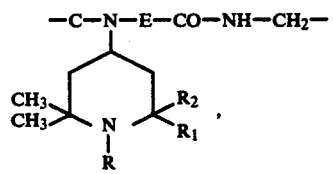

where G is an alkylene group with 2 to 6 carbon atoms, an aralkylene group with 8 to 10 carbon atoms or an arylene group with 6 to 8 carbon atoms, or the group:

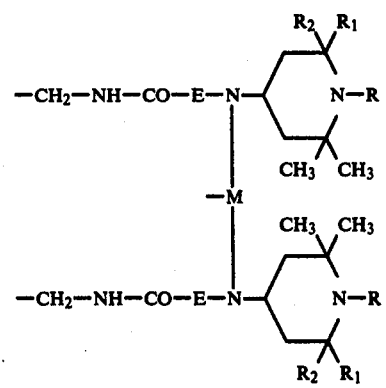

or the group —E—CO—NH—CH$_2$—,
where M is an alkane triyl group with 5 or 6 carbon atoms or an aralkane triyl group with 9 carbon atoms and where E represents a C$_1$ to C$_3$-alkylene radical, the group —CH$_2$—CH(R$_6$)—O— (where R$_6$ is as defined above), the group —(CH$_2$)$_3$—NH—, the group —C$_1$ to C$_3$— alkylene —CO—NH—NH— or a single bond, the radical —CO—NH—CH$_2$— never being directly attached twice to the nitrogen atom in formula (a).

In the context of the invention, permanently stabilised polymers are polymers of which the stabilisation is resistant to extraction by solvents or, for example, aqueous acid solutions by virtue of the chemical attachment of the stabiliser to the polymer.

The stabilized polymers are generally obtained by adding to the polymers, preferably in solution, from 0.05 to 5% by weight (preferably from 0.1 to 3.0% by weight and, with particular preference, from 0.1 to 2.0% by weight) of the 2,2,6,6-tetraalkyl piperidine compounds containing one or more reactive groups, processing the polymers into shaped articles and reactively attaching the stabilisers to the polymers before, during or after the shaping stage.

In cases where the stabilisers contain only one reactive group, they may even be attached to the polymers before the shaping stage.

It is particularly advantageous that permanently stabilised polymers containing chemically attached stabilisers are obtained without having to alter the structure of the polymers. The type of stabiliser added and the quantity in which it is added may be freely selected virtually up to the forming or shaping stage. The chemical attachment between polymer and stabiliser is preferably initiated during or after the shaping stage or after the production of the polymers, the properties of the polymer remaining virtually unaffected. The stabilising properties, too, are apparently influenced to a negligible extent only, if at all, when the stabilisers are fixed to the polymer. Even very small quantities of stabiliser (for example 0.1 to 0.5% by weight) are able to produce an excellent stabilising effect which is not significantly improved by increasing the amount of stabiliser added to more than 5% by weight, so that extremely rational stabilisation is possible with the stabilisers according to the invention. Even small quantities of the stabilisers according to the invention are able (apparently through a synergistic increase in effect) considerably to improve the stabilising effect when used with phenolic antioxidants and/or UV-absorbers.

The stabilising effect obtained in accordance with the invention by means of the tetraalkyl piperidine stabilisers chemically attached to the polymers enables the 2,2,6,6-tetraalkyl piperidine stabilisers to be used even for relatively critical applications, for example for packaging films which come in contact with foodstuffs.

Conventional low molecular weight tetraalkyl piperidine stabilisers are readily extracted from polymer films in contact with dilute acids (for example acetic acid or citric acid) or solvents and fats.

According to the invention, any derivatives of the 2,2,6,6-tetraalkyl piperidines containing one or more "reactive groups", which are able to react with "reactive sites" of the polymers (i.e. reactive hydrogen on O- or N-heteroatoms), are suitable for use as extraction-resistant stabilisers.

In the context of the invention, polymers with "reactive sites" are polymers containing reactive hydrogen on O- or N-heteroatoms, for example polymers containing hydroxyl, primary and/or secondary amino groups, amide groups, imide groups, urethane groups or urea groups (in which case the —NH—CO—NH-group may even be part of a complicated structure). Suitable polymers are, for example, polyvinyl alcohol or copolymers of vinyl alcohol, polyamides or copolyamides based on lactams, diamines, dicarboxylic acids or aminocarboxylic acids, copolyamides containing proportions of secondary amino groups (incorporation of diethylene triamine or the like), aromatic or heterocyclic copolyamides, gelatin, (co)polymers of (meth)acrylamide, polyhydrazides, polysemicarbazides or polymers containing —CO—NH—NH—, —O—CO—NH—NH— or —NH—CO—NH—NH-groups (optionally as part of complicated structures such as, for example, —NH—CO—NH—NH—CO—NH), as for example in segmented polyurethane (ureas). The reactive sites of polymers such as these may be present both as part of the chain, as a side chain and also as terminal groups.

In the context of the invention, "reactive groups" are any groups which are able to react with the reactive sites defined above, but especially methylol groups, methylolether groups, methylol or methylolether groups on N-atoms being particularly preferred.

These particularly preferred methylol or methylolether groups have, for example, the following structural features:
—CO—NH—CH$_2$—OZ
—CO—NH—CO—NH—CH$_2$—OZ
—NH—CO—NH—CO—NH—CH$_2$—OZ
but especially
—NH—CO—NH—CH$_2$—OZ
—CO—NH—NH—CO—NH—CH$_2$—OZ
—NH—CO—NH—NH—CO—NH—CH$_2$—OZ
—O—CO—NH—NH—CO—NH—CH$_3$—OZ
—O—CO—NH—CH$_2$—OZ
in which
Z represents hydrogen or alkyl, preferably C$_1$ to C$_{14}$-alkyl, especially methyl.

Of the preferred compounds of formulae (II), (III) and (IV) above, compounds containing the following radicals are particularly preferred:
R=hydrogen or methyl;
R$_1$ and R$_2$=methyl;
Z=methyl;
compounds of formula (II):
E=a single bond;
R$_3$=hydrogen, a straight-chain or branched C$_1$ to C$_8$-alkyl radical with 1 to 20 carbon atoms, a cyclohexyl radical, a β-cyanoethyl radical, a β-hydroxyalkyl radical, a (meth)acrylic acid methyl or ethyl ester radical;
compounds of formula (III):
E=a single bond;
Y=hydrogen.

The following are examples of the radical R: hydrogen, the methyl, ethyl, n-propyl, isopropyl, n-butyl, sec.-butyl, n-hexyl, n-octyl, n-dodecyl, eicosyl, allyl, α-methallyl, benzyl, α-methylbenzyl, p-ethylbenzyl, α-naphthyl methyl, β-hydroxypropyl or β-hydroxy-β-phenylethyl, β-cyanoethyl, β-methoxycarbonyl ethyl and β-ethoxycarbonyl ethyl groups.

Examples of the radicals R$_1$ and R$_2$ include methyl, ethyl, propyl, isopropyl, n-butyl, sec.-butyl and n-hexyl radical, preferably methyl radicals.

Examples in which $R_1$ and $R_2$ form a cycloalkyl ring with the ring carbon atom to which they are attached include spirocyclopentyl, spirocyclohexyl and spirocycloheptyl rings. $R_1$ and $R_2$ preferably form a spirocyclohexyl ring.

Examples of the radical $R_3$ (E = a single bond) include H, the methyl, ethyl, n-propyl, isopropyl, n-butyl, sec.-butyl, N-octyl, isooctyl, stearyl, eicosyl, cyclopentyl, cyclohexyl, methyl cyclohexyl, cyclododecyl, benzyl, phenylethyl, β-naphthylmethyl, β-cyanoethyl, 2-methoxycarbonylethyl, 2-ethoxycarbonylethyl, 2-isopropoxy carbonylethyl, phenyl, naphthyl, β-hydroxyethyl, β-hydroxy-β-methylethyl and the β-hydroxy-β-phenylethyl group.

$R_3$ preferably represents hydrogen, $C_1$-$C_8$-alkyl radicals, such as methylethyl, n-propyl, isopropyl, n-butyl, sec.-butyl, octyl; also cyclohexyl, methyl cyclohexyl, benzyl, β-cyanoethyl, 2-methoxycarbonylethyl, 2-ethoxycarbonylethyl and β-hydroxyethyl. Hydrogen, methyl, cyclohexyl, benzyl, β-cyanoethyl, 2-ethoxycarbonylethyl and β-hydroxyethyl are particularly preferred meanings for $R_3$.

Further examples of the radical $R_3$ may be represented by the following formulae (E≠a single bond):
—CO—NH—CH$_2$—OH, —CO—NH—CH$_2$—OCH$_3$, —CO—NH—CH$_2$—OC$_3$H$_8$ —CH$_2$—CH$_2$—CO—NH—CH$_2$—OH, —CH$_2$—CO—NH—CH$_2$—OCH$_3$, —(CH$_2$)$_3$—CO—NH—CH$_2$—OC$_4$H$_9$, —CH$_2$—CH$_2$—O—CO—NH—CH$_2$—OCH$_3$, —CH$_2$—CH$_2$—O—CO—NH—CH$_2$—OC$_2$H$_5$, —CH$_2$—CH(CH$_3$)—O—CO—NH—CH$_2$—OC$_4$H$_9$, —CH$_2$—CH—C$_6$H$_5$—O—CO—NH—CH$_2$—OCH$_3$, —(CH$_2$)$_3$NH—CO—NH—CH$_2$—OH, —(CH$_2$)$_3$—NH—CO—NH—CH$_2$OCH$_3$—, —(CH$_2$)$_3$—NH—CO—NH—CH$_2$OC$_3$H$_7$, —CH$_2$—CH$_2$—CO—NH—CO—NH—CH$_2$—OCH$_3$, —CH$_2$—CH$_2$—CO—NH—NH—CO—NH—CH$_2$—OCH$_3$, —CH$_2$—CH$_2$—CO—NH—NH—CO—NH—CH$_2$—OC$_2$H$_5$, —CH$_2$—CH$_2$—CO—NH—NH—CO—NH—CH$_2$-OC$_4$H$_9$, —CO—NH—NH—CO—NH—CH$_2$—OCH$_3$—, —CO—NH—NH—CO—NH—CH$_2$—OC$_3$H$_7$; of these, the —CO—NH—CH$_2$—OZ, the —(CH$_2$)$_3$—NH—CO—NH—CH$_2$—OZ and the (CH$_2$)$_2$—CO—NH—NH—CO—NH—CH$_2$—OZ-radical are preferred, the —CO—NH—CH$_2$—OCH$_3$-radical being particularly preferred.

Examples of the radical G are the ethylene, propylene, tetramethylene or hexamethylene group and also the p-xylylene, p-phenylene or 2,4-tolylene group.

The radical M may be, for example, one of the following groups:

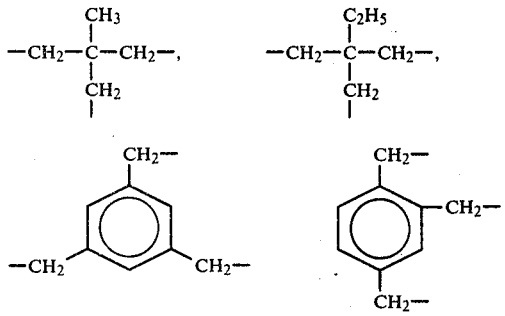

The compounds of general formula (II) (with an N-functional group in the 4-position of the piperidine radical) are particularly preferred and effective. The following are examples of particularly preferred compounds in the context of the invention, although the invention is by no means limited to these compounds:

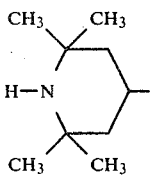

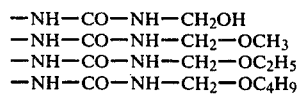
—NH—CO—NH—CH$_2$OH
—NH—CO—NH—CH$_2$—OCH$_3$
—NH—CO—NH—CH$_2$—OC$_2$H$_5$
—NH—CO—NH—CH$_2$—OC$_4$H$_9$

—N—CO—NH—CH$_2$—OH
 |
 CH$_3$

—N—CO—NH—CH$_2$—OCH$_3$
 |
 CH$_3$

—N—CO—NH—CH$_2$—OCH$_3$
 |
 iso.C$_3$H$_7$

—N—CO—NH—CH$_2$—OCH$_3$
 |
 sec.C$_4$H$_9$

—N—CO—NH—CH$_2$—OCH$_3$
 |
 cyclohexyl

—N—CO—NH—CH$_2$—OCH$_3$
 |
 C$_6$H$_{13}$

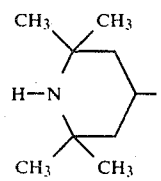

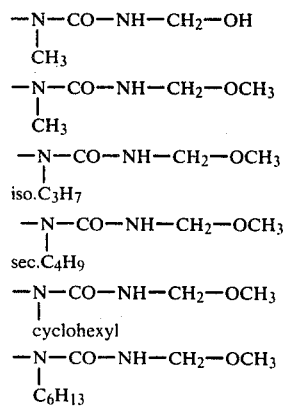

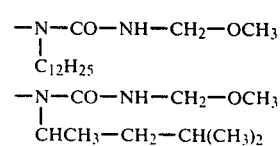
—N—CO—NH—CH$_2$—OCH$_3$
 |
 C$_{12}$H$_{25}$

—N—CO—NH—CH$_2$—OCH$_3$
 |
 CHCH$_3$—CH$_2$—CH(CH$_3$)$_2$

-continued

—N—CO—NH—CH₂—OCH₃
|
CH₂—C₆H₅

—N—CO—NH—CH₂—OCH₃
|
CH₂—CH₂—CN

—N—CO—NH—CH₂—OCH₃
|
CH₂—CH₂—CO₂—C₂H₅

—N—CO—NH—CH₂—OCH₃
|
C₆H₅

—N—CO—NH—CH₂—OCH₃
|
CH₂—CH₂OH

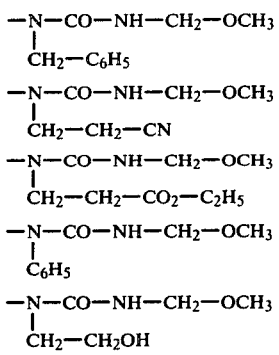

—N—CO—NH—CH₂—OCH₃
|
CH₂—CHCH₃OH

—N—CO—NH—CH₂—OCH₃
|
CH₂—CHC₆H₅—OH

NH—CO—NH—CH₂OH

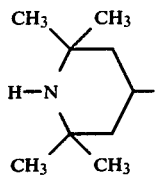

—N—CO—NH—CH₂—OCH₃
|
C₂H₅

—N—CO—NH—CH₂—OCH₃
|
CH₂—CH₂—CO₂—CH₃

—N—CO—NH—CH₂—OC₂H₅
|
cyclohexyl

—N—CO—NH—CH₂—OCH₃
|
CH₂—CH₂—OH

NH—CO—NH—CH₂—OCH₃

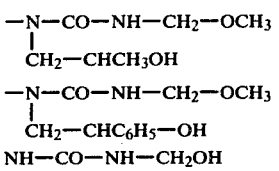

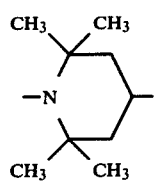

NH—CO—NH—CH₂OH
—NH—CO—NH—CH₂—OCH₃

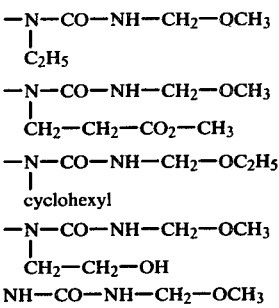

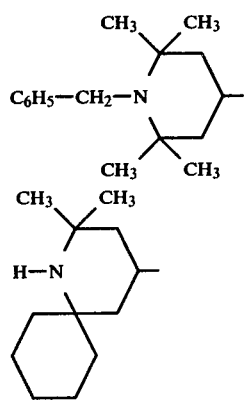

—N—CO—NH—CH₂—OCH₃
|
CH₂—CH₂—CN

—N—CO—NH—CH₂—OCH₃
|
CH₂—CH₂—CO₂C₂H₅

CH₃
|
N—CH₂—CH₂—CH₂—NH—CO—CH₂—OCH₃

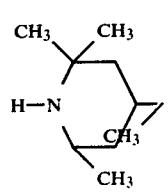

N—CH₂—CH₂—CH₂—NH—CO——CH₂—OCH₃
|
CXH₂—CXH₂ OH

—N—CH₂—CHCH₃—O—CO—NH—CH₂—OCH₃
|
sec.C₄H₉

—N—CH₂—CH(C₆H₅)—O—CO—NH—CH₂—OCH₃
|
C₆H₁₃

—N—CH₂—CH₂—CO—NH—CO—NH—CH₂—OCH₃
|
CH₃

—N—CH₂—CH₂—CO—NH—CO—NH—CH₂OCH₃
|
CH₃

—N—CH₂—CH₂—CO—NH—CO—NH—CH₂OCH₃
|
iso.C₃H₇

—N—CH₂—CH₂—CO—NH—CO—NH—CH₂—OCH₃
|
CH₂—C₆H₅

—N—CH₂—CO—NH—NH—CO—NH—CH₂—OCH₃
|
CH₃

—N—CH₂—CO—NH—NH—CO—NH—CH₂—OCH₃
|
cyclohexyl

—N—CH₂—CH₂—CO—NH—NH—CO—NH—CH₂—OCH₃
|
CH₂—CHCH₃—OH

—N—CH₂—CH₂—CO—NH—NH—CO—NH—CH₂—OCH₃
|
CH₂—CH₂—C₆H₅

—N—CO—NH—CH₂—OCH₃
|
CH₂—CH₂—CO—NH—NH—CO—NH—CH₂—OCH₃

—N—CO—NH—NH—CO—NH—CH₂—OCH₃
|
H

—N—CO—NH—NH—CO—NH—CH—OC₄H₉
|
H

NH—CH₂—CO—NH—CH₂OH

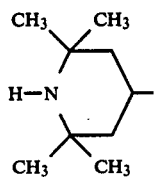

—N—CH₂—CO—NH—CH₂—OH
|
CH₃

—N—CH₂—CH₂—CO—NH—CH₂OH
|
iso C₃H₇

—N—CH₂—CH₂—CO—NH—CH₂OH
|
CH₂—CH₂—CN

—N—CH₂—CH₂—CH₂—CO—NH—CH₂OH
|
CH₂—C₆H₅

—N—CH₂—CH₂—O—CO—NH—CH₂—OCH₃
|
CH₂—CH₂—CN

—N—CH₂—CH₂—O—CO—NH—CH₂—OCH₃
|
CH₂—CH₂—CO₂C₂H₅

—N(CH₂—CH₂—CO—CH—CH₂—OCH₃)₂

—N—CO—NH—CH₂—OCH₃
|
CH₂—CH₂—CH₂—NH—CO—NH—CH₂—OCH₃

—N—CO—NH—CH₂—OCH₃
|
CH₂—CH₂—O—CO—NH—CH₂—OCH₃

—N—CH₂—CH₂—O—CO—NH—CH₂—OCH₃
|
C₆H₅

—N(CH₂—CH₂—CH₂—NH—CO—NH—CH₂—OCH₃)₂

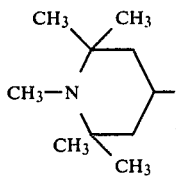

-continued
```
    N—CH2—CH2—O—CO—NH—CH2—OCH3
    |
    CH2—CH2—CN

—N—CH2—CH2—O—CO—NH—CH2—OCH3
    |
    CH3
  —N(CH2—CH2—O—CO—NH—CH2—OCH3)2
  —N—CO—NH—CH2—OCH3
    |
    CH2—CH2—CH2—NH—CO—NH—CH2—OCH3
  —N—CO—NH—CH2—O—CH3
    |
    CH2—CHCH3—O—CO—NH—CH2—OCH3
  —N—CH2—CH2—CO—NH—NH—CO—NH—CH2—OCH3
    |
    CH3
  —N—CO—NH—CH2—OCH3
    |
    CH2—CH2—CO—NH—NH—CO—NH—CH2—OCH3
  —N—CO—NH—NH—CO—NH—CH2—OCH3
    |
    H
   NH—CO—NH—CH2—OH
  —NH—CO—NH—CH2—OCH3
```

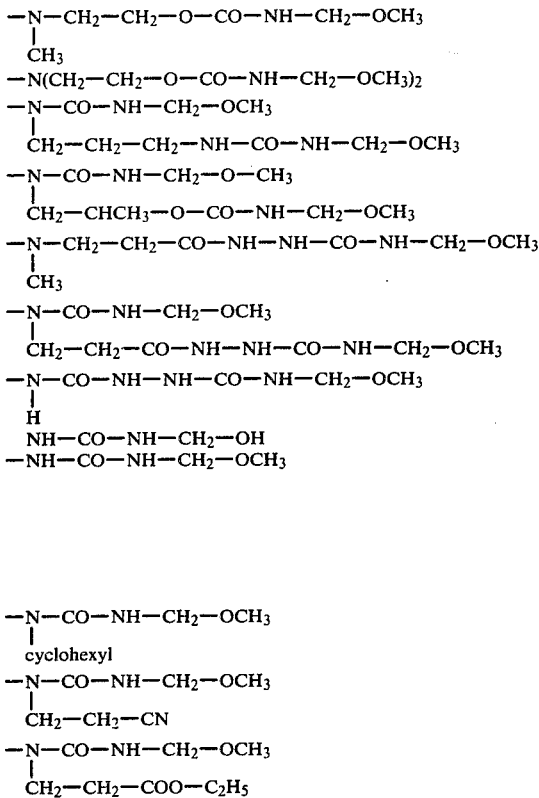

```
  —N—CO—NH—CH2—OCH3
    |
    cyclohexyl
  —N—CO—NH—CH2—OCH3
    |
    CH2—CH2—CN
  —N—CO—NH—CH2—OCH3
    |
    CH2—CH2—COO—C2H5
```

O-(2,2,6,6-tetramethylpiperidin-4-yl)-N-methoxymethyl urethane
O-(1,2,2,6,6-pentamethylpiperidin-4-yl)-N-methoxymethyl urethane
O-(1-benzyl-2,2,6,6-tetramethylpiperidin-4-yl)-N-methoxymethyl urethane
O-(2,2,6,6-tetramethyl-4-cyanopiperidin-4-yl)-N-methoxymethyl urethane
2,2,6,6-tetramethyl-4-hydroxypiperidine-4-carbonyl methoxymethyl semicarbazide
1,2,2,6,6-pentamethyl-4-hydroxypiperidine-4-carbonyl methoxymethyl semicarbazide
2,2,6,6-tetramethyl-4-hydroxypiperidine-4-carbonyl butoxymethyl semicarbazide
N,N'-bis-2,2,6,6-tetramethylpiperidin-4-yl-N,N'-bis-methoxymethylcarbamoyl ethylene diamine
N,N'-bis-1-benzyl-2,2,6,6-tetramethylpiperidin-4-yl-N,N'-bis-methoxymethyl carbamoyl ethylene diamine
N,N'-bis-1,2,2,6,6-pentamethylpiperidin-4-yl-N,N'-bis-methoxymethyl carbamoyl tetramethylene diamine
N,N'-bis-1-β-hydroxyethyl-2,2,6,6-tetramethylpiperidin-4-yl-N,N'-bis-methoxymethyl carbamoyl hexamethylene diamine
N,N'-bis-2,2,6,6-tetramethylpiperidin-4-yl-N,N'-bis-methoxymethyl carbamoyl-p-xylylene diamine
N,N'-bis-2,2,6,6-tetramethylpiperidin-4-yl-N,N'-bis-ethoxymethyl carbamoyl-p-phenylene diamine
N,N'-N''-tris-2,2,6,6-tetramethylpiperidin-4-yl-N,N',N''-tris-methoxymethyl carbamoyl trimethylene ethyl triamine
N,N',N''-tris-2,2,6,6-tetramethylpiperidin-4-yl-N,N',N''-tris-methoxymethyl carbamoyl trimethylene propyl triamine.

2,2,6,6-tetraalkyl piperidines suitable to be used as stabilizers have one or more reactive groups corresponding to the formula:

—NH—CO—CH2—OH and/or

—NH—CO—CH2—Oalkyl

More particularly, the stabilizing compounds correspond to the formula (I):

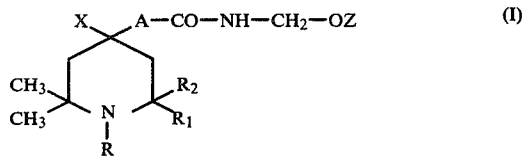

in which
Z represents hydrogen or an alkyl group,
R represents hydrogen, a straight-chain or branched alkyl radical with 1 to 20 carbon atoms, an alkenyl radical with 3 to 5 carbon atoms, an aralkyl radical with 7 to 12 carbon atoms, the group —CH—CH-R$_6$—OH where R$_6$ is hydrogen, methyl or phenyl, the group —CH$_2$—CH$_2$—CN, the group —CH$_2$—CH$_2$—COOalkyl or the group

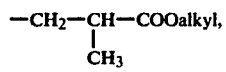

R$_1$ and R$_2$, which may be the same or different, each represents a straight-chain or branched alkyl radical with 1 to 6 carbon atoms or R and R$_2$, together with the ring carbon atom to which they are attached, form a cycloalkyl ring with 5 to 7 carbon atoms.

-A- represents

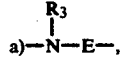

(b) —O—E—, or
(c) —CO—NH—NH—;

in case (a), X in general formula (I) represents hydrogen, in case (b), X represents hydrogen, the cyano group or a —COOR$_7$-group where R$_7$ is an alkyl radical, preferably a methyl or ethyl radical, and in case (c), X represents the OH-group, and R$_3$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylalkyl radical preferably containing 1 to 3 carbon atoms in the alkoxy moiety, an aryl radical with 6 to 10 carbon atoms, the group —CH$_2$—CH(R$_6$)—OH (where R$_6$ is hydrogen, methyl or phenyl), the group

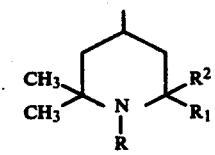

the group

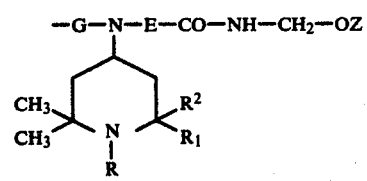

where G is an alkylene group with 2 to 6 carbon atoms, an aralkylene group with 8 to 10 carbon atoms or an arylene group with 6 to 8 carbon atoms, or the group

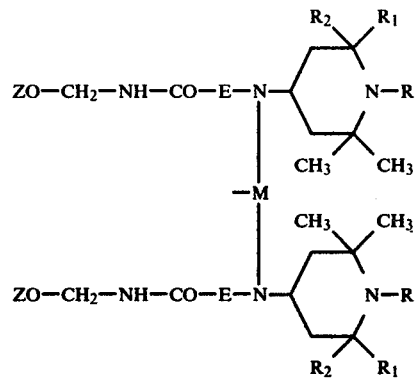

where M is an alkane triyl group with 5 or 6 carbon atoms or an aralkane triyl group with 9 carbon atoms, or the group —E—CO—NH—CH$_2$—OZ, and represents a C$_1$ to 3$_3$ alkylene radical, the group —CH$_2$—CH(R$_6$)—O— (where R$_6$ is as defined above), the group —(CH$_2$)$_3$—NH—, the group —C$_1$ to C$_3$-alkylene —CO—NH—, the group —C$_1$ to C$_3$-alkylene—CO—NH—NH— or the group —CO—NH—NH— or a single bond, the radical —CO—NH—CH$_2$—OZ never being directly attached twice to the nitrogen atom in formula (a).

Compounds corresponding to any of the formulae (II), (III) and (IV) below have proved to be particularly suitable:

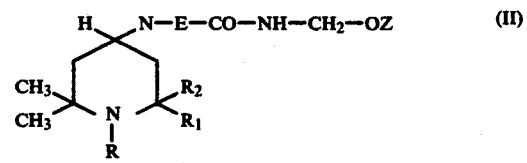

in which Z, E, R, R$_1$, R$_2$ and R$_3$ are as defined above;

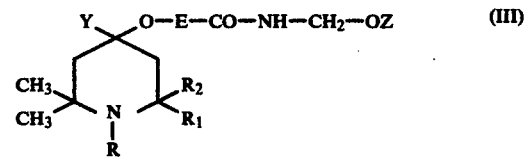

in which
Y represents hydrogen, the cyano group or a COOR$_7$-group,
R$_7$ represents a methyl or ethyl radical, and
Z, E, R, R$_1$ and R$_2$ are as defined above;
and (IV)

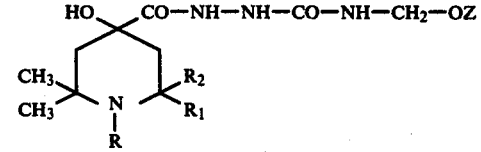

in which Z, R, R$_1$ and R$_2$ are as defined above.

For the production of N-alkoxymethyl derivatives of 4-amino-2,2,6,6-tetraalkyl piperidines substituted in the 1-position or unsubstituted and corresponding to the general formula (V):

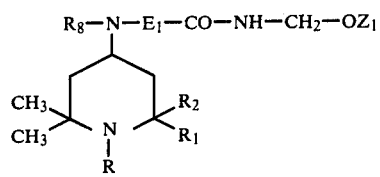

(V)

in which

R represents hydrogen, a straight-chain or branched alkyl radical with 1 to 20 carbon atoms, an alkenyl radical with 3 to 5 carbon atoms, an aralkyl radical with 7 to 12 carbon atoms, the group —CH$_2$—CH-R$_6$—OH, where R$_6$ represents hydrogen, methyl or phenyl, the group —CH$_2$—CH$_2$—CN, the group —CH$_2$—CH$_2$—COOalkyl or the group

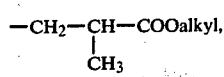

R$_1$ and R$_2$, which may be the same or different, each represents a straight-chain or branched alkyl radical with 1 to 6 carbon atoms, or R$_1$ and R$_2$, together with the ring carbon atom to which they are attached, form a cycloalkyl ring with 5 to 7 carbon atoms, Z$_1$ represents an alkyl group, R$_8$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylethyl radical preferably containing from 1 to 3 carbon atoms in the alkoxy moiety, an aryl radical with 6 to 10 carbon atoms, the group —CH$_2$—CH(R$_6$)—OH (in which R$_6$ represents hydrogen, methyl or phenyl), the group

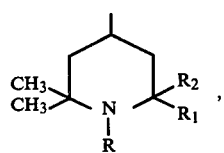

the group

—E$_1$—CO—NH—CH$_2$—OZ$_1$, the group

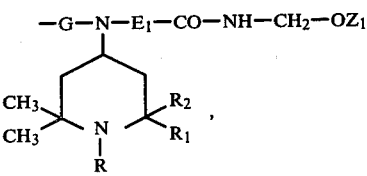

where G is an alkylene group with 2 to 6 carbon atoms, an aralkylene group with 8 to 10 carbon atoms or an arylene group with 6 to 8 carbon atoms, or the group

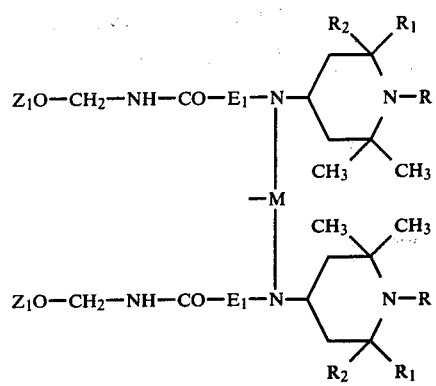

in which M represents an alkane triyl group with 5 or 6 carbon atoms or an aralkane triyl group with 9 carbon atoms, E$_1$ represents a single bond, the group —(CH$_2$)$_3$NH—, the group C$_1$ to C$_3$-alkylene—CO—NH—, the group —C$_1$ to C$_3$-alkylene—CO—NH—NH—, the group —CO—NH—NH— or the group —CH$_2$—CH(R$_6$)—O (where R$_6$ represents hydrogen, methyl or phenyl), wherein a compound corresponding to the general formula:

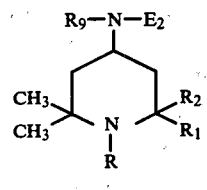

in which

R, R$_1$ and R$_2$ are as defined above,

R$_9$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylethyl radical with 1 to 3 carbon atoms in the alkoxy moiety, an aryl radical with 6 to 10 carbon atoms, the group —CH$_2$—CH(R$_6$)—OH (in which R$_6$ represents hydrogen, methyl or phenyl), the group

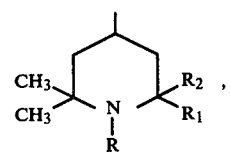

the group

—G—NH—

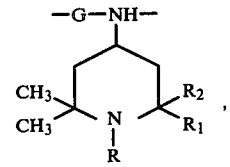

where G is an alkylene group with 2 to 6 carbon atoms, an aralkylene group with 8 to 10 carbon atoms or an arylene group with 6 to 8 carbon atoms, or the group

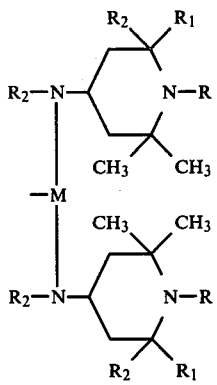

where M is an alkane triyl group with 5 or 6 carbon atoms, or an aralkane triyl group with 9 carbon atoms, or the group E, and $E_2$ represents hydrogen, the group —$(CH_2)_3$—$NH_2$, the group $C_1$ to $C_3$-alkylene—CO—$NH_2$, the group $C_1$ to $C_3$-alkylene—CO—NH—$NH_2$, the group —CO—NH—$NH_2$ or the group —$CH_2$—$CH(R_6)$—OH (where $R_6$ represents hydrogen, methyl or phenyl), is reacted with an alkoxymethyl isocyanate of the formula $Z_1O$—$CH_2$—NCO or with a masked alkoxymethyl isocyanate in such a quantity that one alkoxy methyl isocyanate or masked alkoxymethyl isocyanate is used for every free isocyanate-reactive NH- and/or OH-group.

A process for producing N-alkoxymethyl derivatives of 4-amino-2,2,6,6-tetraalkyl piperidines substituted in the 1-position or unsubstituted and corresponding to the general formula (VI):

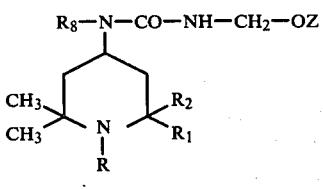

in which

Z represents hydrogen or an alkyl group, and

R, $R_1$, $R_2$, and $R_8$ are as defined above, is chance arived by reacting a compound corresponding to the formula:

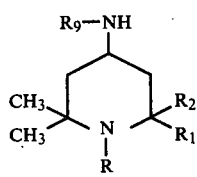

in which $R_9$ is as defined above, is reacted first with cyanic acid and then with formaldehyde in such a way that each NH-group which is not attached to the ring reacts with the cyanic acid to form an —N—CO—$NH_2$— group
|

-continued and then an —N—CO—NH—$CH_2OH$— group,
| optionally followed by etherification in an acid medium with an alcohol of the formula ZOH.

A process for producing N-alkoxymethyl derivatives of 4-amino-2,2,6,6-tetraalkyl piperidines substituted in the 1-position or unsubstituted and corresponding to the general formula (VII):

VII

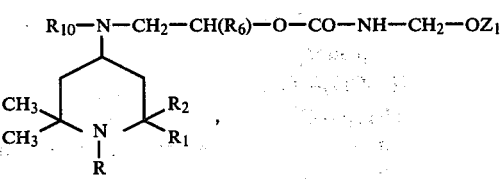

in which

R, $R_1$, $R_2$ and $Z_1$ are as defined above, $R_6$ represents hydrogen, methyl or phenyl, $R_{10}$ represents hydrogen, a straight-chain or branched alkyl radical with 1 to 20 carbon atoms, a cycloalkyl radical with 5 to 12 carbon atoms, an aralkyl radical with 7 to 12 carbon atoms, a $\beta$-cyanoethyl radical, a $\beta$-alkoxycarbonylethyl radical with 1 to 3 carbon atoms in the alkoxy moiety, an aryl radical with 6 to 10 carbon atoms, the group —$CH_2$—$CH(R_6)$—OH (where $R_6$ is hydrogen, methyl or phenyl), the group:

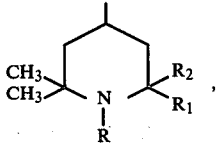

the group:

—G—N—$CH_2$—$CH(R_6)$—O—CO—NH—$CH_2$ $OZ_1$

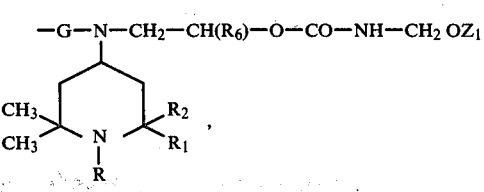

where G is an alkylene group with 2 to 6 carbon atoms, an aralkylene group with 8 to 10 carbon atoms or an arylene group with 6 to 8 carbon atoms, the group:

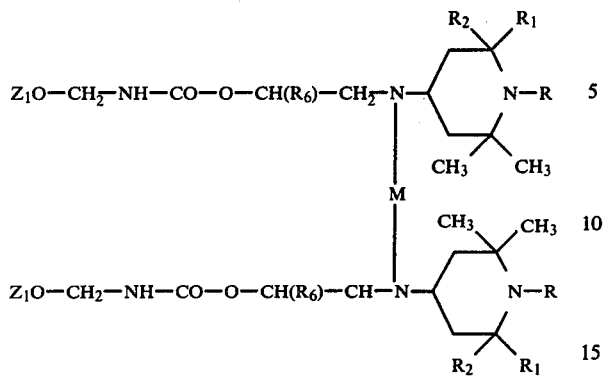

where M is an alkane triyl group with 5 to 6 carbon atoms or an aralkane triyl group with 9 carbon atoms, the group:

—CO—NH—CH$_2$—OZ$_1$, or the group:

—CH$_2$—CH(R$_6$)—O—CO—NH—CH$_2$—OZ$_1$, is characterized by reacting a compound corresponding to the general formula:

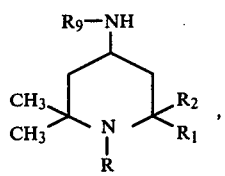

in which

R$_9$ is as defined above, first with 1 mole of an alkylene oxide corresponding to the formula:

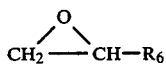

and then with an alkoxymethyl isocyanate of the formula:

Z$_1$O—CH$_2$—NCO in such a way that each primary or secondary amino group which is not attached to the ring reacts with the alkylene oxide to form an

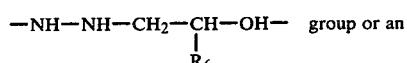 group or an

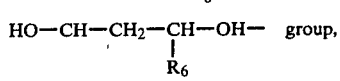 group, after which the OH- and/or secondary amino groups react with the isocyanate.

In order to produce N-alkoxymethyl derivatives of 4-amino-2,2,6,6-tetraalkyl piperidines substituted in the 1-position or unsubstituted and corresponding to the general formula (VIII):

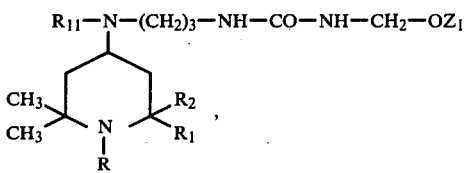

(VIII)

in which

R, R$_1$, R$_2$ and Z$_1$ are as defined above, and

R$_{11}$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylethyl radical with 1 to 3 carbon atoms in the alkoxy moiety, an aryl radical with 6 to 10 carbon atoms, the group —CH$_2$—CH(R$_6$)—OH (where R$_6$ represents hydrogen, methyl or phenyl), the group:

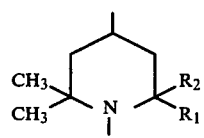

the group

—C—N—(CH$_2$)$_3$—NH—CO—NH—CH$_2$—OZ$_1$

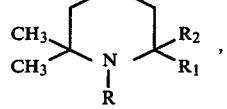

where G is an alkylene group with 2 to 6 carbon atoms, an aralkylene group with 8 to 10 carbon atoms or an arylene group with 6 to 8 carbon atoms, the group:

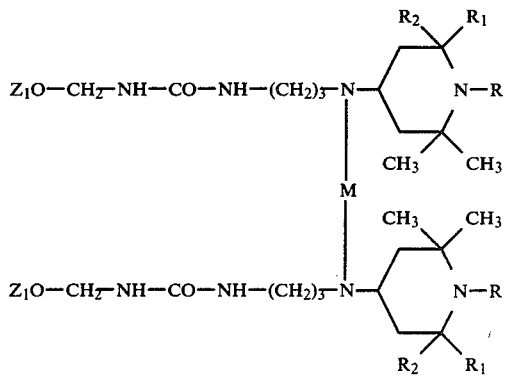

where M represents an alkane triyl group with 5 or 6 carbon atoms or an aralkane triyl group with 9 carbon atoms, the group:

—CO—NH—CH$_2$—OZ$_1$, or the group:

—(CH$_2$)$_3$—NH—CO—NH—CH$_2$—OZ$_1$, a compound corresponding to the general formula:

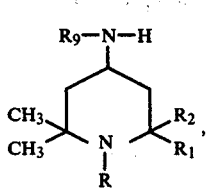

in which $R_9$ is as defined above,
is first cyanoethylated with acrylonitrile on each NH-group which is not attached to the ring, after which the cyanoethyl group is catalytically reduced to form amino groups and the free NH$_2$-groups are then reacted with an alkoxymethyl isocyanate of the formula:

$$Z_1O-CH_2-NCO$$

or with a masked alkoxymethyl isocyanate.

The process for producing N-alkoxymethyl derivatives of 4-amino-2,2,6,6,-tetraalkyl piperidines substituted in the 1-position or unsubstituted and corresponding to the general formula (IX):

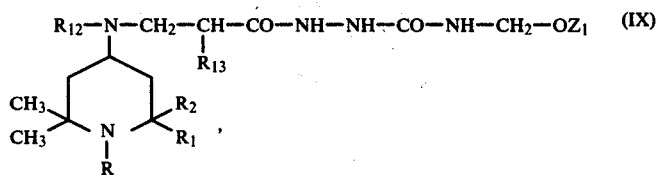

in which
R, $R_1$, $R_2$ and $Z_1$ are as defined above, and
$R_{13}$ represents hydrogen or methyl, $R_{12}$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonyl ethyl radical with 1 to 3 carbon atoms in the alkoxy moiety, an aryl radical with 6 to 10 carbon atoms, the group —CH$_2$—CH(R$_6$)—OH (where R$_6$ represents hydrogen, methyl or phenyl), the group:

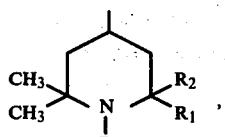

the group:

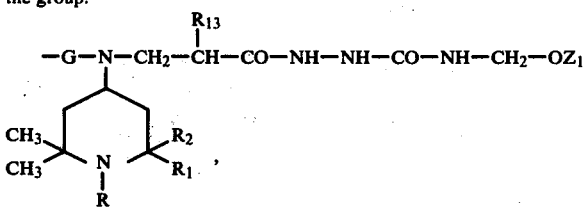

where G represents an alkylene group with 2 to 6 carbon atoms, an aralkylene group with 8 to 10 carbon atoms or an arylene group with 6 to 8 carbon atoms, the group:

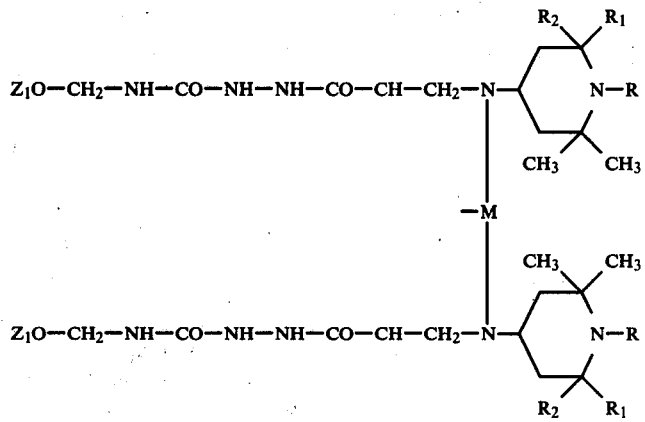

where M represents an alkane triyl group with 5 or 6 carbon atoms or an aralkane triyl group with 9 carbon atoms:
the group: —CO—NH—CH$_2$—OZ$_1$, or the group:

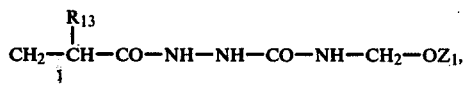

is characterized by reacting a compound corresponding to the general formula:

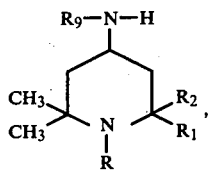

in which
R9 is as defined above,
first with (meth)acrylic acid alkyl esters on each NH-group which is not attached to the ring to form a group

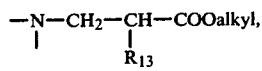

the ester groups obtained are then reacted with hydrazine hydrate to form carboxylic acid hydrazide and the carboxylic acid hydrazide thus obtained and any still free secondary amino groups are subsequently reacted with an alkoxymethyl isocyanate of the formula:

$$Z_1O-CH_2-NCO$$

or with a masked alkoxymethyl isocyanate.

The process for producing N-alkoxymethyl derivatives of 4-amino-2,2,6,6-tetraalkyl piperidines substituted in the 1-position or unsubstituted and corresponding to the general formula (X):

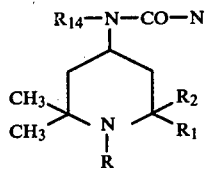

in which
R, $R_1$, $R_2$ and $Z_1$ are as defined above, and
$R_{14}$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylethyl radical with 1 to 3 carbon atoms in the alkoxy moiety, an aryl radical with 6 to 10 carbon atoms, the group —CH$_2$—CH(R$_6$)—OH (where R$_6$ represents hydrogen, methyl or phenyl), the group:

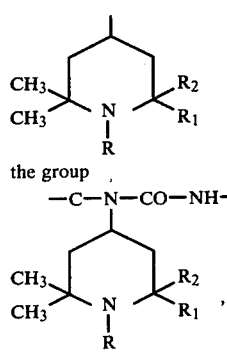

where G is an alkylene group with 2 to 6 carbon atoms, an aralkylene group with 8 to 10 carbon atoms or an arylene group with 6 to 8 carbon atoms, or the group:

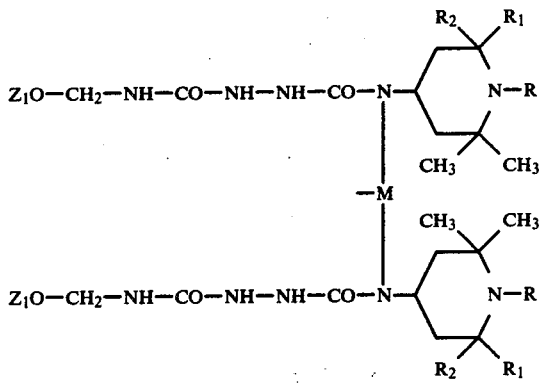

where M is an alkane triyl group with 5 or 6 carbon atoms or an aralkane triyl group with 9 carbon atoms, comprised reacting a compound corresponding to the general formula:

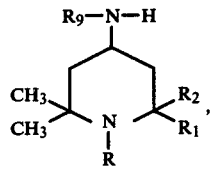

in which
R9 has the meaning defined above, except for the β-alkoxycarbonyl radical,
initially with diphenyl carbonate on each NH-group which is not attached to the ring to form the group

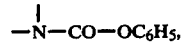

the phenyl ester groups obtained are then reacted with hydrazine hydrate to form the group

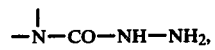

and this group is in turn reacted with an alkoxymethyl isocyanate corresponding to the formula:

$$Z_1O-CH_2-NCO$$

or with a masked alkoxymethyl isocyanate.

The process for producing N-alkoxymethyl derivatives of 4-amino-2,2,6,6-tetraalkyl piperidines substituted in the 1-position or unsubstituted and corresponding to the general formula (XI):

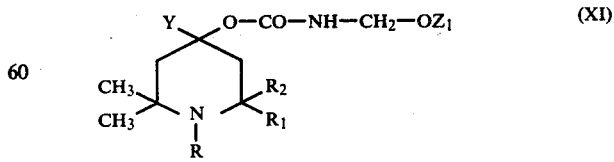

in which
R, $R_1$, $R_2$ and $Z_1$ are as defined above, and
Y represents hydrogen, the cyano group or a COOR$_7$-group where R$_7$ is a C$_1$ to C$_6$-alkyl radical, comprises reaching a compound corresponding to the general formula:

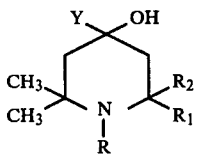

with alkoxymethyl isocyanates corresponding to the formula:

$$Z_1O-CH_2-NCO$$

or with a masked alkoxymethyl isocyanate.

The process for producing N-alkoxymethyl derivatives of 4-amino-2,2,6,6-tetraalkyl piperidines substituted in the 1-position or unsubstituted and corresponding to the general formula (XII):

(XII)

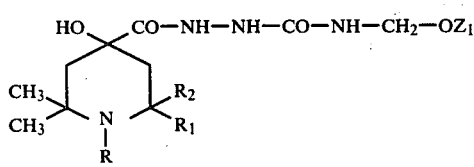

in which
R, $R_1$, $R_2$ and $Z_1$ are as defined above,
comprises reacting a compound corresponding to the general formula:

in which
$R_{15}$ represents an alkyl group, preferably a methyl or ethyl group,
with hydrazine hydrate to form the corresponding hydrazide, which is then reacted with an alkoxymethyl isocyanate of the general formula:

$$Z_1O-CH_2-NCO$$

or with a masked alkoxymethyl isocyanate.

The compounds according to the invention containing "reactive groups" are obtained by the processes described above. The reaction equations shown by way of example in the following are only intended to serve as illustrations:

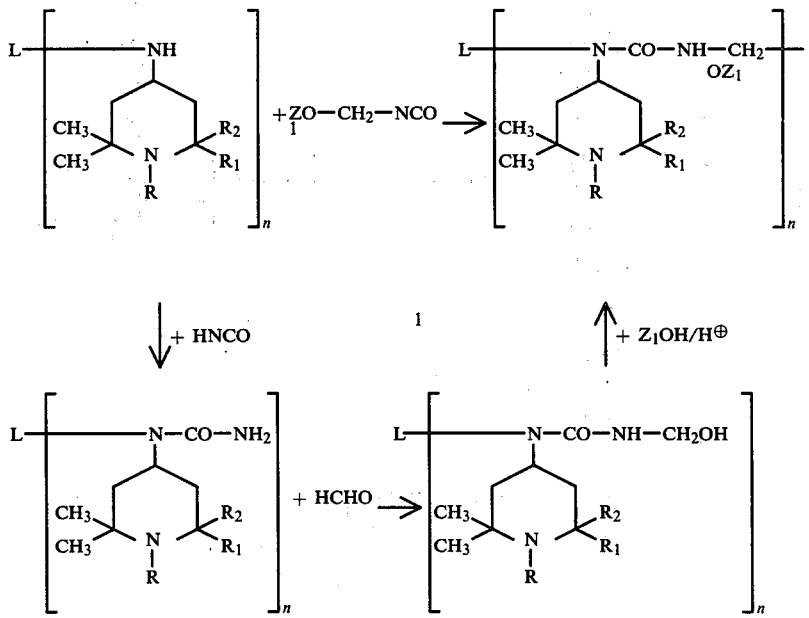

(In this formula scheme and also in the following formula schemes, L may represent for example hydrogen or a monofunctional or polyfunctional radical).

The production of the 4-aminopiperidines required as starting materials is described, for example, in German Offlegungsschrift No. 2,349,962.

Both here and in the following, the free alkoxymethyl isocyanate $$ZO-CH_2-NCO$$
1 may also be replaced by a "masked" alkoxymethyl isocyanate such as, for example, an alkoxyacetonitrile carbonate. Under the reaction conditions, the latter gives off $CO_2$ to form the alkoxymethyl isocyanate which immediately further reacts with the aminopiperidine.

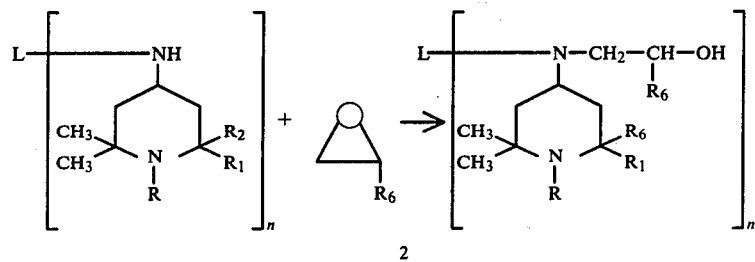
2
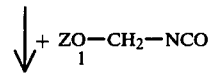
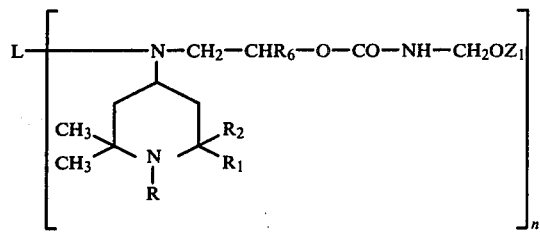
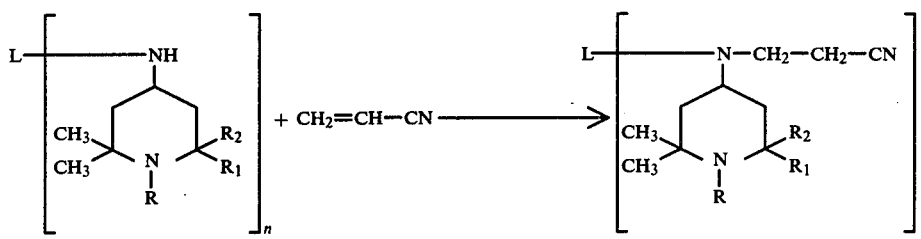
3
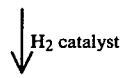
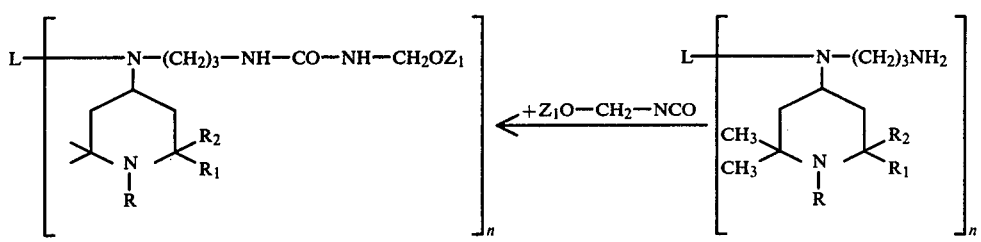
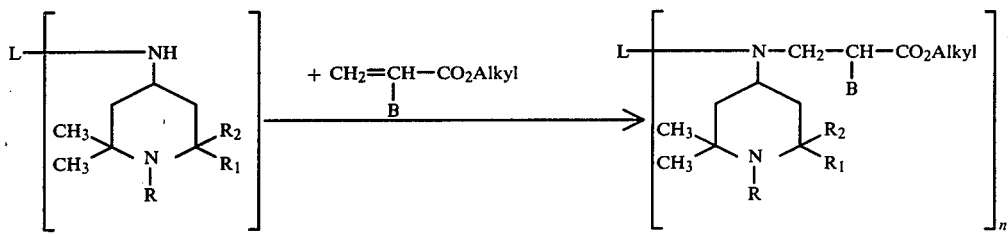
4
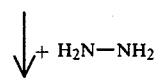

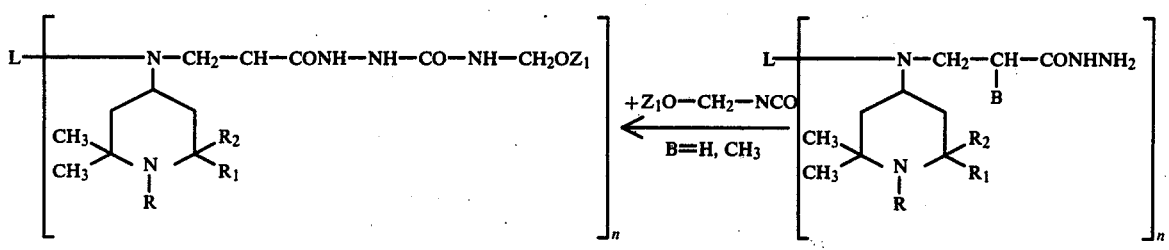

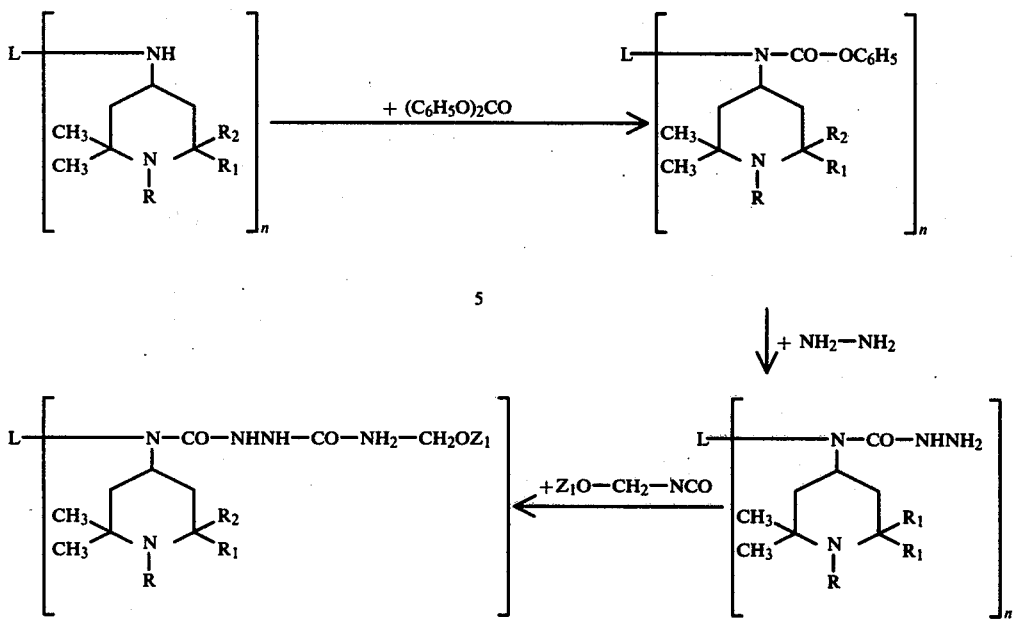

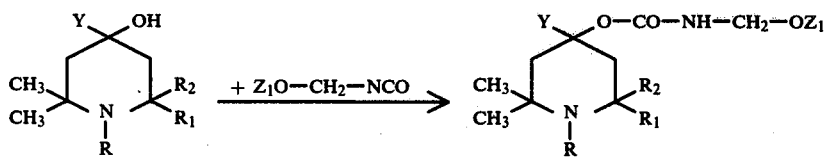

The preparation of the 4-hydroxypiperidines of the general formula (XIV) required as starting materials for reaction (6) is described inter alia in German Offenlegungsschrift No. 2,352,658 (Y=H) and in German Offenlegungsschrift No. 1,695,738 (Y=CN).

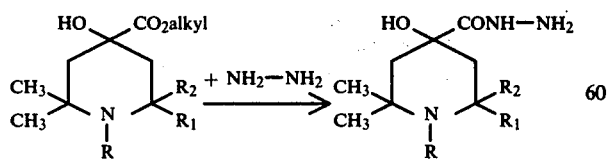

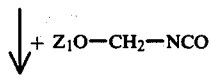

-continued

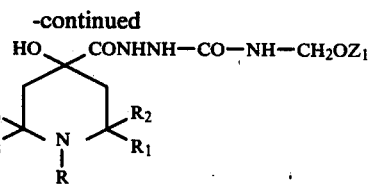

In cases where the reactive groups are introduced more than once into the molecule of the compounds according to the invention, for example in compounds such as

CH₃O—CH₂—NH—CO—NH—(CH₂)₃—N—(CH₂)₃—NH—CO—NH—CH₂—OCH₃

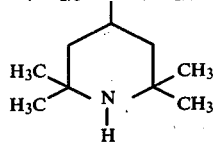

or

CH₃O—CH₂—NH—CO—O—CH₂—CH₂—N—CH₂—CH₂—O—CO—NH—CH₂—OCH₃

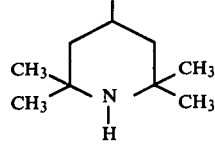

they are able to react monofunctionally or even bifunctionally with "reactive sites" of the polymers; in the latter case, they additionally have a crosslinking function.

A crosslinking effect such as this is highly desirable in certain cases (for example in polyurethane coatings or finishes based on isophorone diisocyanate which are soluble in so-called soft solvents), because, in addition to the stable lightproofing effect, better substrate anchorage and resistance to aqueous alcohol are obtained in this way.

Among the tetraalkyl piperidine derivatives, the tetramethyl piperidine-N-methylolmethyl ethers of the formula (II) are particularly preferred because they show particularly high activity and may readily be synthesised. This applies in particular to compounds of the formula (II) in which R₃ represents H and E represents a single bond.

The compounds according to the invention are basically suitable for use as additives for stabilising synthetic polymers, suitable polymers being any of the polymers which have already been proposed for stabilisation by derivatives of tetramethyl piperidine (cf. for example German Auslegeschrift No. 2,349,962 or German Offenlegungsschrift 25 45 646.)

One particularly important group of polymers with "reactive sites" to be stabilised are linear or branched polyurethanes which may optionally be present in foamed form and which may be produced by methods known per se from the known starting materials. The polyurethanes are generally obtained by reacting relatively high molecular weight polyhydroxyl compounds (for example polyesters or polyethers with a molecular weight of from about 500 to 5000 and with melting points preferably below 60° C.) with aliphatic, araliphatic or aromatic polyisocyanates (preferably aromatic diisocyanates, such as tolylene diisocyanate or diphenyl methane-4,4'-diisocyanate) in the presence of so-called chain extenders or "crosslinkers", i.e. low molecular weight compounds (molecular weight for example from 18 to 400) containing two or more isocyanate-reactive groups (for example water, low molecular weight diols, diamines, hydrazine, dihydrazides or similar compounds such as, for example, aminoalcohols, aminohydrazides, hydroxy hydrazides, aminosemicarbazides, semicarbazide hydrazide, semicarbazide carbazinic esters, polyols, polyamines or corresponding mixtures of these chain extenders) in one or several stages in the melt or in solvents by a number of known and modifiable processes.

The following are mentioned as examples of starting materials for polyurethanes: polyesters of adipic acid and dialcohols with 2 to about 10 carbon atoms, preferably those with more than 5 carbon atoms, the dialcohols optionally being used in admixture to lower the melting points of the polyesters; polyesters of caprolactone and dialcohols, also polyalkylene ether diols, especially polytetramethylene ether diols, polytrimethyl ether diols, polypropylene glycol or corresponding copolyethers. Preferred diisocyanates are aromatic diisocyanates, such as diphenyl methane-4,4'-diisocyanate, tolylene diisocyanate, araliphatic diisocyanates, such as m-xylylene diisocyanate, or even aliphatic diisocyanates, such as hexamethylene diisocyanate and dicyclohexyl methane-4,4'-diisocyanate. These starting materials are reacted, optionally with additionally used dialcohols, to form NCO-preadducts which preferably have the structures defined in Belgian Pat. No. 734,194. Suitable chain extenders, which may optionally be used in admixture or reacted in stages, are water and/or dialcohols or trialcohols, such as butane diol and p-xylylene glycols, trimethylol propane, aminoalcohols such as ethanolamine, diamines such as diphenyl methane-4,4'-diamine, 3,3'-dichlorodiphenyl methane-4,4'-diamine, but preferably aliphatic diamines, such as ethylene diamine, 1,2-propylene diamine, isophorone diamine, meta-xylylene diamine and also hydrazine or dihydrazides, such as carbodihydrazide, oxalic acid dihydrazide, glutaric acid dihydrazide, pimellic acid dihydrazide, terephthalic acid dihydrazide, β-alanyl hydrazide or semicarbazide hydrazides, such as β-semicarbazide alanyl hydrazide, optionally in the form of mixtures of the chain extenders.

The compounds according to the invention are preferably used for stabilising segmented polyurethane elastomers which, in addition to urethane groups, also contain NH—CO—NH-groups formed by reaction of isocyanate groups with water and/or compounds containing terminal NH₂-groups (for example diamines, dihydrazides, carbodihydrazide, semicarbazide hydrazides or hydrazine) and which have a substantially linear, segmented molecular structure, are soluble before shaping in highly polar solvents, such as dimethyl formamide or dimethyl acetamide, and of which the characteristic segments may be characterised by the following formula moiety:

—Y₁—NH—CO—NH—X₁—NH—CO—NH—, this segment optionally having been formed from the reaction of an NCO-preadduct OCN—Y₁—NCO with a chain extender H₂N—X₁—NH₂.

The radical —Y₁— of the NCO-preadduct may have the following composition for example:

—R$_{20}$—NH—CO—O—D—O—CO—NH—R$_{20}$— or any other usual composition (cf. Belgian Pat. No. 734,194).

In the above formula, R$_{20}$ represents a difunctional aliphatic, araliphatic or aromatic radical (of a diisocyanate), D represents the radical of a relatively high molecular weight polyhydroxyl compound with a molecular weight of from 500 to 5000 and with a melting point below 60° C., without its terminal hydroxyl groups (for example a radical of a polyalkylene ether, polyester, polyacetal, or poly-N-alkyl urethane). X$_1$ is the radical of a difunctional chain extender with terminal NH$_2$-groups, without the terminal NH$_2$-groups, for example an aliphatic, araliphatic, aromatic or heterocyclic radical, an —HN—CO—alkylene—CO—NH-radical, an —NH—CO—NH—(CH$_2$)$_2$—CO—NH-radical or a bond between two N-atoms. The synthesis of polyurethane(ureas) such as these is described in detail, for example in German Auslegeschrift No. 1,270,276 and in Belgian Pat. No. 734,194. Polyurethane foams may be produced for example with addition of the stabilisers to the starting components (for example polyethers or polyesters) by known methods and recipes (cf. for example Kunststoff-Handbuch, Vol. VII, Polyurethanes, Carl Hanser Verlag, Munich, 1966, pages 440 to 457, 504 to 531), as may corresponding elastomers, whether of the crosslinked type (for example Vulkollan (Trade Mark), a product of Bayer AG) of with a substantially linear, segmented structure (for example Desmopan (Trade Mark)-types, products of Bayer AG).

In addition to the compounds used according to the invention as stabilisers, other known additives may be worked into the polymer. Additives such as these are, for example, anti-oxidants of the sterically hindered phenol type, such as for example 2,6-di-tert.-butyl-p-cresol; 4,4'-thio-bis-(6-tert.-butyl-3-methyl phenol); 2,2'-thio-bis-(6-tert.-butyl-4-methyl phenol); α,α'-bis(2-hydroxy-3,5'-dialkyl phenyl)-m-diisopropyl benzenes; 2,2'-methylene-bis-(4-methyl-6-tert.-butyl phenol); 2,2'-methylene-bis-(4-methyl-6-cyclohexyl phenyl); 1,1,3-tris-(5-tert.-butyl-4-hydroxy-2-methylphenyl)-butane; tetrakis-(3,5-di-tert.-butyl-4-hydroxyphenyl propionyl oxymethyl)-methane, also compounds of divalent sulphur, such as dilauryl thiodipropionate for example; compounds of trivalent phosphorus, such as, for example, triphenyl phosphite, tris-(p-nonyl phenyl)-phosphite and also UV-absorbers based on 2-(2'-hydroxyphenyl)-benzotriazole, such as for example 2-(2'-hydroxy-5'-methyl phenyl)-benzotriazole, 2-(3',5'-di-tert.-butyl-2'-hydroxyphenyl)-5-chlorobenzotriazole; or benzophenone-based UV-absorbers, such as for example 2-hydroxy-4-octoxybenzophenone; 2',4'-di-tert.-butyl phenyl-3,5-di-tert.-butyl-4-hydroxy benzoate; cyanoacrylic acid esters such as, for example, α-cyano-β-methyl-β-(p-methoxyphenyl)-acrylate and other light stabilisers such as, for example, nickel 2,2'-thio-bis-(4-tert.-octyl phenolate)-n-butylamine. Further representatives are defined in German Auslegeschrift No. 2,349,962, columns 17 to 20. Polymers or copolymers of N,N-dialkylaminoethyl-(meth)-acrylates may also be used for improving dyeability and fastness to chlorine. Two or more of the attachable "TAP" stabilisers (TAP=tetraalkyl piperidine) according to the invention may also be simultaneously used as stabilisers.

In some cases, it is possible to observe stabilising effects which are clearly attributable to a synergistic increase in effect.

The compounds according to the invention are also effective as polymerisation inhibitors in a number of monomers.

The "reactive" lightproofing agents (stabilisers) according to the invention may readily be incorporated in the polymers by any of the standard processes for compounding additives. For example, the stabiliser may be mixed with the synthetic polymers, preferably in the form of polymer solutions, polymer dispersions/suspensions or emulsions. In most cases, mixing is preferably carried out under such conditions that there is very little reaction, if any, with the reactive groups, especially with stabilisers containing two or more reactive groups which may also have a cross-linking effect. The stabilisers may be added in solid form, in liquid (molten) form or in the form of solutions, suspensions or emulsions. In the case of filaments, the stabiliser may be applied in the form of a stabiliser-containing preparation melt. In the case of wet spinning, the stabiliser may be incorporated into the gel filaments from stabiliser-containing coagulation baths. It is preferred to add the stabilisers to solutions of the polymers from which the polymers are shaped.

The quantity of stabiliser used in accordance with the invention is governed by the type and special use of the polymer to be stabilised and may be selected at the discretion of the average expert. Thus, the stabiliser may be added in quantities of from about 0.01 to 5% by weight, preferably in quantities of from 0.1 to 3.0% by weight and, with particular preference, in quantities of from 0.1 to 2.0% by weight, based in each case on the total weight of the stabilised polymer. It is advantageous to add the stabilisers according to the invention in the relatively small quantity which in itself produces an excellent, permanent effect despite the small amounts attached. Thus, additions of less than 0.5% are generally effective, whereas with conventional phenolic stabilisers, for example, considerably larger quantities (1.5 to 2%) are generally required to obtain adequate stabilisation.

The reactive attachment of the reactive stabilisers to the polymers is preferably initiated during processing to form the shaped article or in the shaped article itself. The reaction is initiated by treatment at elevated temperatures, generally at temperatures of from about 70° to 200° C., the reaction optionally being accelerated by the presence of catalysts. Catalysts suitable for this purpose are acid catalysts, such as ammonium chloride or citric acid. The reactive stabilisers show hardly any volatility or, at least, considerably reduced volatility at the high temperatures prevailing in the dry spinning duct and, for this reason, are also superior to stabilisers of the additive type.

The reaction temperature and reaction time are selected in such a way that they lead to the required reaction, depending upon the reactive group and upon the reactive site in the polymer. The reaction time may be relatively long, for example about 1 hour in cases where films are dried at around 100° C., although it may be reduced to the order of seconds at correspondingly elevated temperatures, for example in cases where filaments are spun in a highly heated duct (air temperature, for example from 200° to 350° C.) or in cases where the filaments are aftertreated, for example on heating godets, in which case the godet temperatures may be in the range of from about 140° to 350° C.

In special cases (only one reactive group in the light stabiliser), it is also possible to react the reactive groups in the stabilisers in solution with the polymers and only then to carry out the shaping operation. On the other hand, the polymers may also be modified by sprinkling them with the stabilisers, followed by sintering.

However, a particularly suitable and preferred form of carrying out the invention is to add the reactive stabilisers to solutions of the polymers and to process the solutions into films, coatings or filaments accompanied or followed by reaction of the stabilisers with the shaped articles. One typical example is the spinning of stabiliser-containing polyurethane elastomer solutions with evaporation of the solvents (for example dimethyl formamide) in a hot spinning duct. In cases where the stabiliser according to Example 1 is used together with a small quantity of catalyst, the reaction between the stabiliser and the segmented polyurethane (urea) has actually progressed to a large extent by the time the spun filaments leave the spinning duct and is completed by heating the filaments in fixing cabinets, on heating godets or during the heat-fixing of fabrics (for example tenter frame fixing at 190° to 200° C./20 to 60 seconds.

It is particularly preferred to use the reactive stabilisers in shaped articles having a relatively large surface, more especially fibres and filaments, films and coatings or artificial leather structures. In this case, the advantages afforded by the invention, for example resistance to extraction, physiologically compatible fixing to the polymer, and stability to boiling, dyeing, washing and dry cleaning, develop their full effect. The process according to the invention is particularly valuable for stabilising segmented polyurethanes, especially in the form of the polyurethane elastomer filaments. These advantages of the invention have already been described and are substantiated in detail and compared with the prior art in the Examples.

The polyurethane solutions are generally knife-coated onto glass plates in the form of approximately 20% solutions in a layer thickness of from about 0.6 to 0.8 mm and then dried in a drying cabinet (for about 30 minutes at 70° C.+another 40 minutes at 100° C.). Following the application of a little talcum, the films are drawn off.

The films are exposed to light either in the form of approximately 1 cm wide strips and/or in the form of cut filaments. To produce the cut filaments, the films are sliced into filaments with a denier of about 300 dtex in a film-slicing machine equipped with a set of blades.

The solutions may be wet-spun in aqueous coagulation baths (for test purposes through a 20/0.12 mm nozzle into an 80/20 water/DMF bath at 80° C., take-off rate 10 m/minute) and are dried after passing through washing baths. For dry spinning, the slightly heated solution (to approximately 60° C.) is spun through nozzles into a heated spinning duct, to which hot air is additionally delivered in parallel current, and run off at about 100 to 450 m/minute. For test purposes, the filaments are spun through 16/0.2 mm nozzles, run off from the spinning duct at 100 m/minute and, after preparation with talcum, are wound onto package form at 130 m/minute. The packages are heated for 1 hour at 130° C.

For Fadeometer testing, the strips of film or filaments are exposed to light on cardboard supports in the Fadeometer. The particular test groups according to the Examples are simultaneously introduced into the exposure chamber so that, even with fluctuations in exposure, comparable light intensities act on the test specimens.

The extraction treatments are carried out in the manner described on films and spun filaments in the form of light packages on small frames. Drying is carried out at room temperature or in a water jet vacuum at 50° C. $\eta_i$-value: The molecular weight is characterised by the $\eta_i$-value. To this end, 1 g of polymer (expressed as pigment-free polymer) is dissolved while shaking in 100 ml of hexamethyl phosphoramide (HMPA) at room temperature, the solution is filtered through a coarse glass frit and the relative solution viscosities are measured in an Ubbelohde viscosimeter at 25° C.

$$\eta_i = \ln \eta_R / C$$

$\eta_R$=relative solution viscosity, C=concentration in g/100 ml.

Dyeing: The filaments are heated to boiling point over a period of 1 hour with 2% by weight of a red dye (Colour Index No. 23 635) in 1% acetic acid solution.

The parts quoted in the Examples are parts by weight, unless otherwise indicated. Percentages represent percent by weight, unless otherwise indicated.

EXAMPLE I

N-Methoxymethyl-N'-2,2,6,6-tetramethyl piperidin-4-yl urea 31 g (0.2 mole) of 4-amino-2,2,6,6-tetramethyl piperidine are dissolved in 100 ml of toluene, followed by the dropwise addition while cooling with ice of 17.5 g (0.2 mole) of methoxymethyl isocyanate. The solvent is then evaporated off in vacuo, leaving 48 g (99% of the theoretical amount) of a solid colourless product with a melting point of 96° C.

$C_{12}H_{25}N_3O_2$ (243.4): Calculated: C 58.3%; H 10.4%; N 17.3%; Observed: C 59.2%; H 10.1%; N 17.5%

EXAMPLE 2

Hydroxymethyl-2,2,6,6-tetramethyl piperidin-4-yl urea . HCl 19.9 g of 2,2,6,6-tetramethyl piperidin-4-yl urea . HCl (obtained from 2,2,6,6-TMP-HCl with KOCN; m.p.>300° C.) are introduced into a mixture of 13.4 g of 37% formalin solution and 20 g of water, and the mixture is stirred for 24 hours at room temperature. The crystals formed are then filtered off under suction and recrystallised from a liberal amount of methanol. 16.0 g of colourless, glossy needles melting at 263 to 265° C. (decomposition) are obtained. The compound is readily soluble in water, moderately soluble in methanol and sparingly soluble to very sparingly soluble in all other organic solvents.

$C_{11}H_{24}ClN_3O_2$ (265.8): Calculated: C 49.7%; H 9.1%; N 15.8%; Cl 13.3%; Observed: C 49.3%; H 8.9%; N 15.8%; Cl 13.5%

EXAMPLES 3 TO 12

The methoxymethyl ureas (XIII) summarised in Table 1 are obtained in the same way as in Example 1 by reacting the corresponding 4-alkylamino-2,2,6,6-tetramethyl piperidines with methoxymethyl isocyanate:

Table I $$R-N-H \text{ (structure with 2,2,6,6-tetramethylpiperidine)} \xrightarrow{+ CH_3O-CH_2-N=C=O \text{ (MMI)}} R-N-CO-NH-CH_2-OCH_3 \text{ (XIII)}$$

| Example No. | XIII. R | Melting Point (°C.) | Yield | Elemental analysis | | | |
|---|---|---|---|---|---|---|---|
| 3 | —CH$_2$—CH$_2$—CO$_2$C$_2$H$_5$ | resin | 96% | calculated: C 59.5 | H 9.6 | N 12.2 | |
|   |   |   |   | observed: 59.3 | 9.5 | 12.1 | |
| 4 | —CH$_2$—CH$_2$—CN | 129° | 91% | calculated: C 60.8 | H 9.5 N | 18.9 | |
|   |   |   |   | observed: 60.7 | 9.6 | 18.9 | |
| 5 | —(CH$_2$)$_3$—NH—C(=O)—NH—CH$_2$OCH$_3$ (twice the quantity of MMI used) | 147° | 91% | calculated: C 55.8 | H 9.6 N | 18.1 | |
|   |   |   |   | observed: 55.7 | 9.4 | 17.8 | |
| 6 | —nC$_6$H$_{13}$— | resin | 98% | calculated: C 66.0 | H 11.4 N | 12.8 | |
|   |   |   |   | observed: 65.9 | 11.6 | 12.0 | |
| 7 | —nC$_3$H$_7$ | 136°–38° | 66% | calculated: C 63.2 | H 11.0 N | 14.7 | |
|   |   |   |   | observed: 63.4 | 11.1 | 14.5 | |
| 8 | —nC$_{12}$H$_{25}$ | oil | 99% | calculated: C 70.0 | H 12.0 N | 10.2 | |
|   |   |   |   | observed: 68.3 | 11.5 | 9.8 | |
| 9 | —C$_6$H$_{11}$ (cyclohexyl) | 118° | 91.5% | calculated: C 66.4 | H 10.8 N | 12.9 | |
|   |   |   |   | observed: 65.6 | 10.3 | 13.9 | |
| 10 | —CH$_2$—CH$_2$OH | oil | 98% | calculated: C 58.5 | H 10.2 N | 14.6 | |
|   |   |   |   | observed: 58.7 | 10.1 | 14.6 | |
| 11 | —CH$_2$—CH(CH$_3$)$_2$ | 126° | 93.5% | calculated: C 64.3 | H 11.1 N | 14.0 | |
|   |   |   |   | observed: 64.6 | 11.0 | 14.2 | |
| 12 | —CH(CH$_3$)CH$_2$CH(CH$_3$)$_2$ | 71° | 99% | calculated: C 66.0 | H 11.4 N | 12.8 | |
|   |   |   |   | observed: 66.1 | 11.2 | 12.8 | |

Procedure for producing the starting material of Example 3

(XIII, R=CH$_2$—CH$_2$—COO—C$_2$H$_5$)

β-(2,2,6,6-Tetramethylpiperidin-4-yl)-aminopropionic acid ethyl ester 31.4 parts of 4-amino-2,2,6,6-tetramethyl-piperidine and 100 parts of ethylacrylate are boiled under reflux for 5 hours and the mixture is subsequently fractionated in vacuo. β-(2,2,6,6-Tetramethylpiperidin-4-yl)-aminopropionic acid ethyl ester boiling at 112°–115° C./0.06 Torr is obtained in a yield of 43 parts (84% of the theoretical amount).

Procedure for producing the starting material of Example 4

(XIII, R=—CH$_2$—CH$_2$—CN)

β-(2,2,6,6-Tetramethylpiperidin-4-yl)-aminopropionitrile 156 parts of 4-amino-2,2,6,6-tetramethylpiperidine and 132.5 parts of acrylonitrile are stirred for 3.5 hours at 80° C. and the mixture is subsequently fractionated in vacuo, giving 190 parts (90.8% of the theoretical amount) of the nitrile in the form of a colourless liquid boiling at 107°–110° C./0.04 Torr.

Procedure for producing the starting material of Example 5

(XIII, R=—CH$_2$—CH$_2$—CH$_2$—NH$_2$)

4-(γ-Aminopropyl)-amino-2,2,6,6-tetramethylpiperidine

A mixture of 131 parts of the nitrile R=—CH$_2$—CH$_2$—CN, 600 parts of methanol, 150 parts of liquid NH$_3$ and 25 parts of Ra—Co are hydrogenated at 80° to 100° C./80 to 100 bars H$_2$ until the uptake of hydrogen is over. After the catalyst has been filtered off, the mixture is fractionated in vacuo, giving 120 parts (89.6% of the theoretical amount) of 4-(γ-aminopropyl)-amino-2,2,6,6-tetramethyl piperidine in the form of a colourless liquid boiling at 95° C./0.1 Torr. C$_{12}$H$_{27}$N$_3$ (213.4).

EXAMPLE 13

(a) Procedure for producing the starting material:

2,2,6,6-Tetramethyl-4-hydroxypiperidine-4-carboxylic acid hydrazide 16.2 parts of 2,2,6,6-tetramethyl-4-hydroxypiperidine-4-carboxylic acid methyl ester (according to German Patent No. 91,122), 5 parts of hydrazine hydrate and 20 parts of methanol are boiled under reflux for 10 hours and the methanol is subsequently distilled off. The residue is recrystallised from cyclohexane. Yield: 15.3 parts of 2,2,6,6-tetramethyl-4-hydroxypiperidine-4-carboxylic acid hydrazide melting at 121° to 123° C. C$_{10}$H$_{21}$N$_3$O$_3$ (231.3).

(b) Stabiliser according to the invention 4.62 parts (20 mMole) of the carboxylic acid hydrazide produced as described above are dissolved in 10 parts of dimethyl formamide and reacted with 0.174 parts (20 mMole) of methoxymethyl isocyanate in 7 parts of dimethyl formamide to form the methoxymethyl urea derivative. (An oily substance is left after removal of the solvent). Stabilisation is obtained by adding the solution of the derivatives thus produced to the elastomer solution.

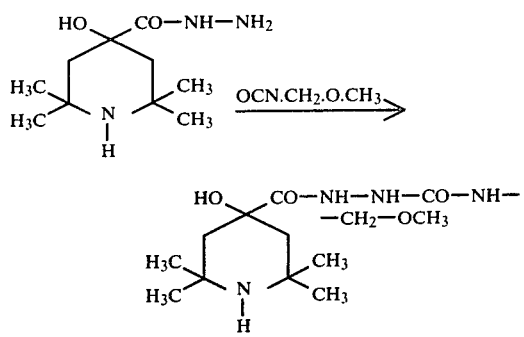

EXAMPLE 14

N-Methoxymethyl-0-2,2,6,6-tetramethylpiperidin-4-yl urethane 53.3 parts of 4-hydroxy-2,2,6,6-tetramethylpiperidine and 40 parts of methoxymethyl isocyanate are dissolved in 500 parts of methylene chloride with the addition of 1 part of triethylene diamine, and the resulting mixture is boiled under reflux for 150 hours. Excess methoxymethyl isocyanate and methylene chloride are then evaporated off, and the residue is recrystallised from petrol, giving colourless crystals melting at 110° to 112° C. Yield: 45 parts=56% of the theoretical amount. $C_{12}H_{24}N_2O_3$ (244.3).

EXAMPLE 15

(a) Procedure for producing the starting product

β-(2,2,6,6-Tetramethylpiperidin-4-yl)-aminopropionic acid hydrazide 51.2 parts of the ester according to formula (XIII, $R=CH_2—CH_2—CO_2—C_2H_5$) and 20 parts of hydrazine hydrate are boiled under reflux for 16 hours in 100 parts of alcohol. Removal of the alcohol by evaporation leaves 48 parts (100% of the theoretical amount) of the hydrazide in the form of a colourless, tacky crystal mass.

$C_{12}H_{26}N_4O$ (242.4): Calculated: C 59.5%; H 10.8%; N 23.1%; Observed: C 59.6%; H 10.6%; N 23.2%

(b) Compound according to the invention (XIII, $R=—CH_2—CH_2—CO—NH—NH—CO—NH—CH_2—OCH_3$)

36.3 parts of β-(2,2,6,6-tetramethylpiperidin-4-yl)amino-propionic acid hydrazide are dissolved in 100 parts of toluene, followed by the dropwise addition of 28.2 parts of 93% methoxymethyl isocyanate. After stirring for 1 hour at 25° C., the deposit is filtered off under suction. The filter residue is stirred with 300 parts of petroleum ether and refiltered under suction. 48 parts of colourless crystals melting at 62° to 65° C. are left after drying.

$C_{18}H_{36}N_6O_5$ (416.5).

EXAMPLE 16

1.25 ml of a 30% sulphur dioxide solution in dioxane are added to 600 parts of an adipic acid copolyester (molecular weight 1915) with 65 mole % of 1,6-hexane diol and 35 mole % of 2,2-dimethyl propane diol, followed by dehydration for 1 hour in vacuo at 130° C.

Following the addition of 12.15 parts of N-methyl-bis-(β-hydroxypropyl)-amine to the polyester, a solution of 168.15 parts of diphenyl methane-4,4'-diisocyanate in 195 parts of dimethyl formamide is added at 40° C., followed by heating for 60 minutes at 50° to 53° C. to form the prepolymer (2.715% of NCO in the solids).

10 parts of solid carbon dioxide are added to a solution of 3.35 parts of 99% ethylene diamine in 449 parts of dimethyl formamide to form the carbamate, after which 210 parts of the above NCO-prepolymer solution are introduced and 0.10 part of hexane-1,6-diisocyanate is added. The elastomer solution (790 Poises) is pigmented with 4% of $TiO_2$ (Rutil FD-2, a product of BAYER AG).

The following stabilisers are added to proportions of the solutions:

(a) —comparison, no stabiliser added
(b) —2% Tinuvin (Trade Mark) 770 (a product of Ciba-Geigy)—Comparison Test

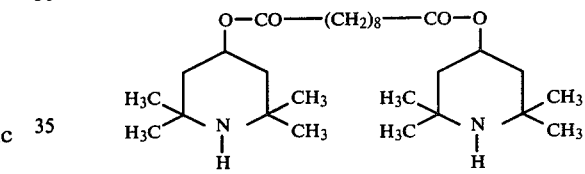

(c) 2% of a stabiliser combination corresponding to the formula:

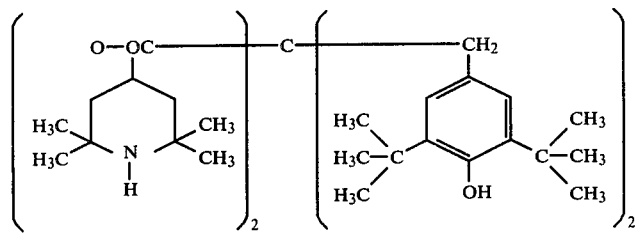

Comparison test m.p. 215°–217° C.

(a) stabilizer combination which is sparingly soluble in water and substantially insoluble in petroleum ether).
(d) 2% of attachable stabiliser according to Example 11 (+0.4% of citric acid)
(e) 2% of double reactive-stabiliser according to Example 5 (+0.4% of citric acid)
(f) 2% of stabiliser according to Example 1-catalyst 0.4% of citric acid
   +1% of Irganox 1010 (a product of Ciba-Geigy)
   +1% of Tinuvin 327 (a product of Ciba-Geigy; benztriazole UV-absorber)
(g) 0.33% of stabiliser according to Example 1
   +1% of Irganox 1010
   +1% of Tinuvin 327

(h) 2% of Tinuvin 770 (comparison test)
   +1% of Irganox 1010
   +1% of Tinuvin 327.

The solutions are cast into films (drying at 70/100/130° C.), optionally sliced into filaments ("sliced filaments") or dry-spun (nozzle 16/0.2 mm; denier approx. 130 dtex.) and the filaments are subjected on bobbins to thermal aftertreatment at 130° C. (or overheating godets—surface temperature 180° C.).

(1.) Dyeability test

The filaments (partly in the form of sliced filaments, partly in the form of dry-spun filaments) were dyed for 1 hour with the red dye (C.I. 23 635) and the dyed filaments were tested while wet for their abrasion resistance (see Table 2). Whereas the elastomer filaments modified in accordance with the invention with the attachable stabilisers show a normal affinity for dyes and give abrasion-resistant dye finishes, the comparison tests with the stabilisers of the tetramethyl piperidine series according to the prior art lead to considerable faults in dyeability and also to reduced abrasion resistance, obviously due to "dye salt" formation from basic stabiliser and acid dyes (tests b, c, h).

It was found that the originally good stabilising effect of the stabilisers according to (b) and (c) is almost completely lost by solvent extraction and boiling with weak acetic acid solution. By contrast, the stabilising effect of the stabilisers according to the invention (d), (e) remains almost fully intact.

Filaments dry spun from solutions with the following composition:

| | |
|---|---|
| (a) | (without stabiliser) |
| (d) | stabiliser (1) according to the invention |
| (g) | (stabiliser 1 according to the invention)     } |
| | + phenolic stabiliser/UV-absorber     } |
| (k) | (1% of phenolic stabiliser (IRGANOX 1010)     } |
| | (+ 1% of UV-absorber (TINUVIN 327)     } |
| | as comparison test to g) | are exposed to light in a Fadeometer. The filaments are found to have the following residual strengths after exposure for 66 hours.

(a) <0.08 g/dtex—without stabiliser—
(d) 0.28 g/dtex (according to the invention)

Table 2:

Dyeing with 2% Supranolechtrot-GG (acid dye) in weak acetic acid solution

| Filament compositon | Type of filaments | Dye finish on the sliced filaments | Residual Absorption on wool | Abrasion resistance of the dyed elastomer filaments | Remarks |
|---|---|---|---|---|---|
| (a) V | SF, DSF. | deep-red dye finish | light red | abrasion-resistant | (unstabilised types) |
| (b) V | SF, DSF. | as (a), somewhat lighter than (a) | red | heavy abrasion | stabiliser migrates and probably forms deposits with dye |
| (c) V | SF | light red, patchy | light red | very heavy abrasion | |
| (d) | SF, DSF. | deep red | light red | abrasion-resistant | extraction-resistant stabilisation |
| (e) | SF | deep red | light red | abrasion-resistant | |
| (f) | SF, DSF. | deep red | light red | abrasion-resistant | stabilised filaments |
| (g) | SF | deep red | light red | abrasion-resistant | stabilised filaments |
| (h) V | SF, DSF. | deep red | red | heavy abrasion | see (b)/(c) |

(SF = sliced filaments)
(DSF = dry spun filaments)
(V = comparison tests)

(2.) Testing for UV-stabiliser effect and resistance to extraction

Films with the compositions (a), (b), (c), (d) and (e) are exposed to light in a Fadeometer
   (α) in their original state,
   (β) after extraction for 1 hour with carbon tetrachloride, and
   (γ) after boiling for 1 hour with 1% acetic acid solution.

For discolouration, see Table 3

(g) 0.51 g/dtex (according to the invention, synergistic effect)
(k) ~0.10 g/dtex—comparison—

Whereas filaments without the stabiliser according to the invention are heavily discoloured and totally degraded, the stabiliser according to the invention has a distinct stabilising effect, as reflected in a very clear increase in effect in the simultaneous presence of phenolic stabilisers and UV-stabilisers, even when the stabiliser according to the invention is added in a very small quantity.

Table 3:

| | UV-exposure of films (Fadeometer) | | | | | | | | |
|---|---|---|---|---|---|---|---|---|---|
| | Discolouration after Fadeometer testing for | | | | | | | | |
| | 22 hours | | | 44 hours | | | 88 hours | | |
| Composition of film | original (α) | CCl$_4$ (β) | acetic acid (γ) | original (α) | CCl$_4$ (β) | acetic acid (γ) | original (α) | CCl$_4$ (β) | acetic acid (γ) | Remarks |
| (a) (V) | yellowish yellow | yellowish yellow | yellowish yellow | yellow | yellow | yellow | yellow-brown | yellow-brown | yellow-brown | unstabilised |

Table 3:-continued

| | UV-exposure of films (Fadeometer) | | | | | | | | | |
|---|---|---|---|---|---|---|---|---|---|---|
| | Discolouration after Fadeometer testing for | | | | | | | | | |
| | 22 hours | | | 44 hours | | | 88 hours | | | |
| Composition of film | original (α) | CCl₄ (β) | acetic acid (γ) | original (α) | CCl₄ (β) | acetic acid (γ) | original (α) | CCl₄ (β) | acetic acid (γ) | Remarks |
| (b) (V) | colourless | yellowish yellow | yellowish yellow | almost colourless | yellow | yellow | almost colourless | yellow-brown | yellow-brown | extractable stabilisers |
| (c) (V) | colourless | yellowish yellow | yellowish yellow | almost colourless | yellow | yellow | almost colourless | yellow-brown | yellow-brown | |
| (d) (xxx) stabilisers | colourless | colourless | colourless | colourless | (almost) (x) colourless | colourless | colourless | (almost) (x) colourless | colourless | extraction- |
| (e) | colourless | colourless | colourless | colourless | colourless (xx) | colourless | colourless | colourless | colourless | according to the invention |

(x) the film dried at 100° C. discolours slightly more easily (reaction still not altogether complete) the film dried at 130° C. is substantially colourless (the stabiliser is fixed)
(xx) films no longer soluble in DMF
(xxx) the same results are obtained when only 0.5% of the stabiliser according to Example 1 is added.

Proportions of the solutions according to Example 16 have added to them
(i) 1% by weight of the phenolic stabiliser:

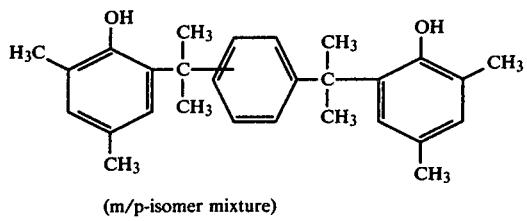

(m/p-isomer mixture)

+1% of Tinuvin 327 (a product of Ciba-Geigy)
(k) 1% of the phenolic stabiliser according to i) +1% of the stabiliser 1) according to the invention,
after which the solutions are dry-spun through 16/0.2-nozzles. The elastomer filaments are run off from the spinning duct at 100 m/minute and, after preparation, are wound into package form at around 130 m/minute. The packages are heated for 1 hour to 130° C. and subsequently measured.

The following tensile strengths (in g/dtex) of the filaments (denier approximately 180 dtex, individual filament denier approximately 11 dtex) are obtained after Fadeometer testing for 0, 22, 44, 66 and 88 hours.

| Before exposure (g/dtex) | after 22 hours | after 44 hours | after 66 hours |
|---|---|---|---|
| i) 0.56 | 0.52 | 0.48 | 0.08 |
| k) 0.56 | 0.62 | 0.63 | 0.47 |

The results show the advantageous co-stabilising effect obtained with the stabiliser according to the invention in relation to conventional stabiliser mixtures.

EXAMPLE 17

400 parts of the hexane diol-neopentyl glycol-adipic acid polyester (MW 1915) (see Example 16) are mixed with 7.92 parts of N-methyl-bis-(β-hydroxypropyl)-amine, the resulting mixture is heated for 50 minutes to 50° C. with a solution of 112 parts of diphenyl methane-4,4'-diisocyanate and is subsequently cooled. The NCO-prepolymer solution formed has an NCO-content of 2.865% (based on solids).

11.68 parts of $H_2N-NH-CO-NH-CH_2-CH_2-CO-NH-NH_2$ are dissolved in 23 parts of water, the resulting solution is mixed with 580 parts of dimethyl formamide and 268.75 parts of the above NCO-propolymer are introduced into the mixture over a period of 3 minutes, resulting in the formation of a clear, highly viscous elastomer solution (~600 Poises) which is pigmented with 4% of $TiO_2$ "Rutil KB".

The following additions are made to proportions of the solution:
(a) no stabiliser,
(b) 2.0% of stabiliser according to Example (1), based on solids,
(c) 0.5% of stabiliser according to Example (1), based on solids,
(d) 0.5% of Tinuvin 770,
and films are prepared from the solution (drying temperature 100° C. or 130° C.). The films are sliced into filaments (approximately 350 dtex) and Fadeometer-tested
(α) untreated,
(β) after extraction for 1 hour with boiling carbon tetrachloride, and
(γ) after boiling for 1 hour with 1% acetic acid solution.
The results are set out in Table 4.

The results confirm the good stabilising effect of the stabilisers according to the invention which are not affected to any significant extent even by extraction treatments (the slight differences are partly attributable to some slight damage caused by the extraction treatments). By contrast, Tinuvin 770 is almost quantitatively removed by the extraction treatments.

Dyeing tests with 2% of the red acid dye (C.I. 23 635) show good dyeability without any abrasion resistance problems in the case of the stabilisers according to the invention, whereas in cases where non-incorporable stabilisers according to the prior art are added the (somewhat inferior) dye finish is virtually non-resistant to abrasion (see also Examples 16 and 18).

Table 4:

UV-exposure of sliced filaments (polyester urethane, hydrazide types) comparison of the loss of strength and discolouraton of original filaments as against extracted filaments

| Filament | | Tensile strength and discolouraton after Fadeometer testing for | | | | | | | |
|---|---|---|---|---|---|---|---|---|---|
| | | 0 hours | | 22 hours | | 66 hours | | 132 hours | |
| | | TS g/dtex | discolour-ation | TS g/dtex | discolour-ation | TS g/dtex | discolour-ation | TS g/dtex | discolour-ation |
| a) | α | 0.60 | colourless* | 0.12 | pale yellowish | no longer measurable bright yellow | | no longer measurable, yellow-brown | |
| b*** | α | 0.54 | colourless* | 0.48 | colourless | 0.44 | colour-less | 0.28 | yellowish |
| | β | 0.48 | " | 0.51 | " | 0.38 | " | 0.24 | " |
| | γ | 0.48 | " | 0.47 | " | 0.38 | " | 0.25 | " |
| c | α | not measured | colourless* | — | colourless | — | colour-less | — | yellowish yellow |
| | β | | " | | " | | " | | " |
| | γ | | " | | " | | " | | " |
| d | α | 0.55 | colourless** | 0.47 | colourless | 0.40 | colour-less | 0.20 | yellowish yellow |
| | β | — | " | 0.20 | yellowish | no longer measurable (<0.10 g/dtex) | bright yellow | no longer measurable | yellow-brown |
| | γ | — | " | 0.19 | yellowish | | bright yellow | | yellow-brown |

After dyeing with 2% of the red acid dye (C.I. 23 635)
*abrasion-resistant dye finish
**non-abrasion-resistant dye finish
***a more or less comparable stabilising effect is obtained with only 0.5% of the stabiliser.

EXAMPLE 18

1 ml of a 33% $SO_2$-solution in dioxane and then a solution of 140.3 parts of diphenyl methane-4,4-diisocyanate in 185 parts of dimethyl formamide are added to 600 parts of a polytetramethylene ether diol with a molecular weight of 2000. After a reaction time of 30 minutes at 40° C., followed by cooling to room temperature, the NCO-prepolymer solution (80%) thus formed has an NCO-content of 2.29% NCO. 407.5 parts of this NCO-prepolymer solution are stirred into a suspension prepared by introducing 20 parts of solid carbon dioxide into a solution of 5.869 parts of hydrazine hydrate in 879 parts of dimethyl formamide. A clear elastomer solution with a viscosity of 540 Poises is obtained in a few minutes. After pigmenting with 4% of $TiO_2$ (Rutil FD, a product of Bayer AG), the solution is divided into three parts and (a) with no stabiliser added
(b) with 2% of Tinuvin 770 (a product of Ciba-Geigy) added for comparison with the stabilizer according to the prior art, and
(c) with 2% of the reactive stabiliser according to Example 1 added, is cast onto glass plates and the solvent is removed over a period of 1 hour at 70° to 100° C. A portion of film (c) is additionally heated for 1 hour to 130° C.

Some of the filaments are sliced in a film slicing machine to form filaments with a thickness of about 300 dtex (100° films) which are then dyed by boiling for 1 hour with 2% of the red acid dye (C.I. 23 635) in weak acetic acid solution.

The filaments according to (a) (comparison test without any addition of stabiliser) show only a relatively low absorption of the dye, being pale red in colour after dyeing. The non-absorbed dye is quantitatively absorbed onto wool and produces a deep-red dye on the wool. The dye finish of the elastomer filaments is abrasion-resistant.

The filaments according to (b) (comparison test with the addition of a conventional stabiliser) show a distinctly reduced absorption of dye in relation to (c) and, after dyeing, are only light red in colour and also patchy as a result of deposits on the surface of the fibres. It is clear that a dye salt has formed from the Tinuvin 770 stabiliser added and the dye, and has been deposited, the deposit being responsible for the lack of resistance to abrasion. By after-absorption onto wool, only a small quantity of dye can be absorbed onto the wool (light red).

The elastomer filaments according to (c) modified with stabiliser in accordance with the invention show a better dye finish than (a) and are abrasion-resistant because no deposits have formed.

The rest of the films are exposed to light in a Fadeometer in the form of approximately 1 cm wide strips.

The stabiliser-free film (a) is yellow in colour and has lost much of its strength (tensile strength <50% of the initial value) after only 44 hours and is completely degraded after 88 hours in the Fadeometer. The films (b) containing Tinuvin 770 (comparison test with conventional stabiliser) are pale yellowish in colour after 22 hours and distinctly yellowish in colour after 110 hours in the Fadeometer, but have retained their tensile strength. The film (c) provided with the attached stabiliser in accordance with the invention is unchanged in colour and has completely retained its strength, even after 154 hours in the Fadeometer. However, by boiling for 1 hour in 1% acetic acid or by treatment for 1 hour with perchlorethylene at 50° C., the stabilising effect according to (b) is completely lost (degradation on exposure as in the case of film (a)), whereas it has remained largely intact in the films (c).

Even after the extremely long exposure time of 440 hours in the Fadeometer, the films with the extraction-resistant stabilisation (stabiliser 1) according to the invention are still substantially colourless, do not show any surface crackling when stretched and are still highly elastic, extraction with chlorinated hydrocarbons and boiling with 1% acetic acid producing no deterioration in colour. See Table 5 for the results of measurements on sliced filaments.

(α) in their original state,
(β) after extraction with
  (a) boiling perchlorethylene (1 hour) or
  (b) perchlorethylene, 1 hour/50° C., Table 5

Fadeometer testing of sliced filaments[x] (approx. 700 dtex) based on polytetramethylene ether/MDI/hydrazine (Example 18)

| Filament | Addition | Before exposure TS g/dtex | Before exposure elongation % | After 22 hours' exposure TS g/dtex | After 22 hours' exposure elongation % | After 22 hours' exposure colour | After 88 hours' exposure TS g/dtex | After 88 hours' exposure elongation % | After 88 hours' exposure colour | After 132 hours' exposure TS g/dtex | After 132 hours' exposure elongation % | After 132 hours' exposure colour | After 230 hours' exposure TS g/dtex | After 230 hours' exposure elongation % | After 230 hours' exposure colour |
|---|---|---|---|---|---|---|---|---|---|---|---|---|---|---|---|
| 18 a α | None | 0.38 | 807 | 0.33 | 645 | yellow | filaments destroyed-yellow-brown | | — | | | — | | | |
| 18 b | +2% of Tinuvin 770 | | | | | | | | | | | | | | |
| α | | 0.38 | 775 | 0.41 | 747 | almost colourless | 0.42 | 740 | almost colourless | 0.38 | 700 | almost colourless | 0.18 | 495 | yellowish |
| β | | 0.38 | 800 | 0.33 | 650 | yellow | filaments destroyed-yellow-brown | | | (Note:stabilser completely extracted) | | | | | |
| γ | | 0.40 | 815 | 0.43 | 750 | yellowish | filaments destroyed, yellow-brown | | | " | | | | | |
| 18 c | +2% of stabiliser according to Example 1 | | | | | | | | | | | | | | |
| α | | 0.45 | 800 | 0.42 | 750 | almost colourless | 0.46 | 775 | almost colourless | 0.40 | 721 | almost colourless | 0.29 | 634 | almost colourless |
| β | | 0.38 | 775 | 0.38 | 685 | almost colourless | 0.35 | 685 | almost colourless | 0.36 | 685 | almost colourless | 0.23 | 510 | almost colourless |
| γ | | 0.38 | 775 | 0.43 | 715 | almost colourless | 0.35 | 665 | almost colourless | 0.28 | 547 | almost colourless | — | | | x) filaments heat-fixed for 1 hour at 130° C.
α) original condition
β) 1 hour/50° C. in perchlorethylene
γ) 1 hour/1% acetic acid, boiling
MDI = 4,4'-diphenylmethane diisocyanate

EXAMPLE 19

Attachable stabilisers are introduced into and dissolved in an elastomer solution, produced as described in Example 17, in the quantities indicated (for screening reasons, generally 2.0%; the quantity was not reduced in the test). The solutions are cast into films and the resulting films (drying temperature 70°/100°/130° C.—1 hour) are Fadeometer-tested (γ) after boiling for 1 hour with 1% of acetic acid solution.

The results are set out in Table 6.

It was found that all the stabilisers according to the invention are substantially resistant to extraction and, hence, differ with considerable advantage from the readily extractable stabiliser additives, such as Tinuvin 770 (for comparisons, see Examples 16 to 18).

Table 6

Fadeometer testing of films with and without extraction

| Stabiliser according to Example No. (Comparison) | Quantity added none | | Discolouration after Fadeometer testing (in hours) 44 | 66 | 88 | 110 | 154 |
|---|---|---|---|---|---|---|---|
| | | α | yellow | yellow | yellow-brown | yellow-brown | brown |
| 2 | 2% | α | colourless | almost colourless | yellow | — | — |
| | | β/a | " | " | " | — | — |
| | | γ | " | " | " | — | — |
| 3 | 2% | α | colourless | colourless | colourless | — | — |
| | | β/a | " | almost colourless | almost colourless | — | — |
| | | γ | " | " | " | — | — |
| 4 | 2% | α | colourless | colourless | almost colourless | almost colourless | yellowish |
| | | β/a | " | " | " | " | " |
| | | γ | " | " | " | " | " |
| 5 | 2% | α | colourless | colourless | colourless | colourless | — |
| | | β/a | " | " | " | almost colourless | — |
| | | γ | " | " | " | " | — |
| 6 | 2% | α | colourless | colourless | colourless | colourless | almost colourless |
| | | β/a | " | " | " | almost colourless | yellowish |
| | | γ | " | " | " | " | almost colourless |
| 7 | 2% | α | colourless | colourless | colourless | colourless | almost colourless |
| | | β/a | " | " | " | " | " |
| | | γ | " | " | " | " | " |
| 8 | 2% | α | colourless | colourless | colourless | colourless | colourless |
| | | β/a | " | almost colourless | almost colourless | almost colourless | almost colourless |
| | | γ | " | colourless | colourless | almost colourless | almost colourless |

Table 6-continued

Fadeometer testing of films with and without extraction

| Stabiliser according to Example No. (Comparison) | Quantity added | | Discolouration after Fadeometer testing (in hours) | | | | |
|---|---|---|---|---|---|---|---|
| | none | | 44 | 66 | 88 | 110 | 154 |
| | | $\alpha$ | yellow | yellow | yellow-brown | yellow-brown | brown |
| 9 | 2% | $\alpha$ | colourless | colourless | colourless | colourless | almost colourless |
| | | $\beta/a$ | " | almost colourless | almost colourless | almost colourless | yellowish |
| | | $\gamma$ | " | " | " | " | almost colourless |
| 10 | 2% | $\alpha$ | colourless | colourless | colourless | colourless | almost colourless |
| | | $\beta/a$ | " | " | " | almost colourless | almost colourless |
| | | $\gamma$ | " | " | " | " | " |
| 11 | 2% | $\alpha$ | colourless | almost colourless | — | almost colourless | yellow |
| | | $\beta/a$ | " | " | — | " | " |
| | | $\gamma$ | " | " | — | yellowish | " |
| 12 | 2% | $\alpha$ | colourless | colourless | — | — | — |
| | | $\beta/a$ | " | " | — | — | — |
| | | $\gamma$ | " | " | — | — | — |
| 13 | 2% | $\alpha$ | colourless | colourless | colourless | colourless | almost colourless |
| | | $\beta/a$ | " | " | " | almost colourless | " |
| | | $\gamma$ | " | " | " | colourless | " |
| 14 | 2% | $\alpha$ | almost colourless | yellowish | yellow | yellow-brown | — |
| 15 | 2% | $\alpha$ | colourless | colourless | almost colourless | almost colourless | — |

EXAMPLE 20

A copolyamide (polycondensed from 50 parts of caprolactam, 35 parts of 6,6-salt and 20 parts of 6,10-salt) is dissolved in a mixture of 85 parts by weight of methanol, 6 parts by weight of isopropanol, 4.5 parts by weight of isobutanol and 4.5 parts by weight of water to form an approximately 12% solution.

Proportions of the solutions are cast into thin films
(a) without added stabiliser,
(b) with 0.4% of Tinuvin 770 added (Comparison),
(c) with 0.4% of the stabiliser according to Example 1 added.

The films thus cast are dried for 1 hour at 130° C. in a drying cabinet and Fadeometer-tested for 300 hours. The stabiliser-free copolyamide (a) is embrittled and breaks when the film is flexed; films (b) and (c) have remained flexible.

However, when films (b) and (c) are treated for 24 hours with a 2.5% acetic acid solution and then for 5×30 minutes with perchlorethylene at 50° C. and subsequently exposed to light, film (b) also becomes fragile, whilst film (c) remains flexible.

EXAMPLE 21

600 parts of a 1,6-hexane diol polycarbonate (molecular weight 1925) are heated for about 220 minutes to 97° C. with 138.5 parts of 1-isocyanato-3-isocyanatomethyl-3,5,5-trimethyl cyclohexane and 185.5 parts of the aromatic hydrocarbon mixture "Solvesso-100" (a product of SHELL), resulting in the formation of an NCO-prepolymer solution with an NCO-content of 3.58% (based on solids).

4.2 parts of 1,4-diaminocyclohexane (17.3% of cis-/82.7% of trans isomer) are introduced into 233 parts of Solvesso/ethylene glycol (1:1), followed by the introduction with stirring of 107.5 parts of the prepolymer solution. The homogeneous solution (266 Poises/20° C.) is cast into films with and without stabiliser added and the films thus cast are briefly dried at about 150° C. in a drying tunnel.

Although the aliphatic polyurethane (used for coating compositions and finishes for artificial leather) remains colourless on exposure to light, its tensile strength decreases. The stabiliser added in accordance with the invention retards the degradation process to a considerable extent. The effect of the stabiliser is not reduced by treatment for 2×30 minutes with perchlorethylene, the films having become insoluble.

Table 6

| | Original TS g/dtex | after 154 Fadeometer hours |
|---|---|---|
| without stabiliser | 0.69 | 0.29 |
| with 0.4% of stabiliser according to Example 5 | | |
| + 0.1% of monochloroacetic acid | 0.69 | 0.64 |

EXAMPLE 22

100 parts of GL-N-Resin granulate, an almost completely hydrolysed ethylene-vinylacetate copolymer containing approximately 85% by weight of vinylacetate before hydrolysis (manufacturers: Nippon Synthetic Chemical Industry Co., Ltd. Japan) are softened for 24 hours in 400 parts of dimethyl acetamide and then dissolved for 6 hours at 80° C. and for 2 hours at 100° C.

0.5% of the stabiliser 1 according to the invention (based on polymer solids) are added to proportions of the 20% solution, after which the solution is dried to form approximately 0.15 mm thick films (45 minutes at 70° C.+90 minutes at 100° C.). Some of the films are boiled for 1 hour with carbon tetrachloride. A film of GL-N-Resin without any stabiliser added is Fadeometer tested for 550 hours for comparison with the stabilised films. Whereas the unstabilised film breaks as a result of embrittlement, the stabilised films are still colourless and completely flexible. The stabilisation according to the invention is resistant to extraction.

EXAMPLE 23

(a) 1,2,2,6,6-Pentamethyl-4-aminopiperidine (starting material)

750 parts of 4-benzoylamino-1,2,2,6,6-pentamethyl piperidine are dissolved in 1000 parts of concentrated hydrochloric acid and the resulting solution is boiled under reflux for 10 hours. After cooling, sodium hydroxide is added until an alkaline reaction is obtained and the mixture is repeatedly extracted with methylene chloride. The residue obtained after removal of the methylene chloride by evaporation is distilled in vacuo, 300 parts of 1,2,2,6,6-pentamethyl-4-aminopiperidine boiling at 98° C./15 Torr distilling over.

(b) N-Methoxymethyl-N'-(1,2,2,6,6-pentamethylpiperidine-4-yl)-urea (Compound according to the invention)

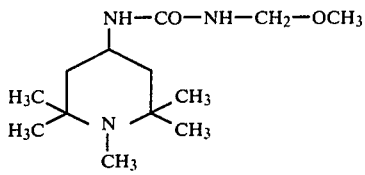

34 parts of 1,2,2,6,6-pentamethyl-4-aminopiperidine are dissolved in 100 parts of toluene, followed by the dropwise addition at 25° C. of 18.8 parts of 93% methoxymethyl isocyanate. After stirring for 1 hour at 25° C., the toluene is evaporated off in vacuo and the residue is crystallised from cleaning spirit, giving 42.5 g of colourless crystals melting at 105° C.

$C_{13}H_{27}N_3O_3$ (257.4): calculated: C 60.7%; H 10.6%; N 16.3%; observed: C 60.7%; H 10.1%; N 16.3%

42.1 parts of N-methoxymethyl-N'-1,2,2,6,6-pentamethylpiperidine-4-yl urea are obtained in the same way using 26.2 parts of methoxymethyl acetonitrile carbonate instead of 18.8 parts of 93% methoxymethyl isocyanate.

EXAMPLE 24

(a) 4-Amino-1-allyl-2,2,6,6-tetramethylpiperidine (starting material)

164 parts of 4-amino-1-allyl-2,2,6,6-tetramethylpiperidine (b.p. 112° C./15 Torr) are obtained from 300 parts of 4-benzoyl-amino-1-allyl-2,2,6,6-tetramethylpiperidine by the same hydrolysis reaction as in Example 23a.

(b) N-methoxymethyl-N'-(1-allyl-2,2,6,6-tetramethylpiperidin-4-yl)-urea (Compound according to the invention)

50 parts of N-methoxymethyl-N'-1-allyl-2,2,6,6-tetramethyl-piperidin-4-yl urea are obtained in the same way as in Example 23(b) using 39 parts of 4-amino-1-allyl-2,2,6,6-tetramethylpiperidine.

EXAMPLE 25

(a) 4-Amino-1-ethyl-2,2,6,6-tetramethylpiperidine (starting material)

130 parts of 4-amino-1-ethyl-2,2,6,6-tetramethylpiperidine boiling at 105°–107° C./15 Torr are obtained from 288 parts of 4-benzoylamino-1-ethyl-2,2,6,6-tetramethylpiperidine by the same hydrolysis reaction as in Example 22(a).

(b) N-Methoxymethyl-N'-(1-ethyl-2,2,6,6-tetramethyl-piperidine-4-yl)-urea (stabiliser according to the invention)

46 parts of N-methoxymethyl-N'-1-ethyl-2,2,6,6-tetramethylpiperidine-4-yl urea are obtained by reacting 36.6 parts of 4-amino-1-ethyl-2,2,6,6-tetramethylpiperidine with methoxymethyl isocyanate in the same way as described in Example 22(b)

EXAMPLE 26

(a) 4-Amino-1-benzyl-2,2,6,6-tetramethylpiperidine (starting material)

218 parts of 4-amino-1-benzyl-2,2,6,6-tetramethylpiperidine boiling at 110° C./0.1 Torr are obtained from 350.5 parts of 4-benzolyamino-1-benzyl-2,2,6,6-tetramethylpiperidine by the same hydrolysis reaction as described in Example 23(a).

(b) N-Methoxymethyl-N'-(1-benzyl-2,2,6,6-tetramethyl-piperidin-4-yl)-urea (Compound according to the invention)

51 parts of N-methoxymethyl-N'-1-benzyl-2,2,6,6-tetramethylpiperidin-4-yl urea are obtained by reacting 49.1 parts of 4-amino-1-benzyl-2,2,6,6-tetramethylpiperidine with methoxymethyl isocyanate in the same way as described in Example 23(b).

EXAMPLE 27

(a) 4-(β-Cyanoethyl)-amino-1,2,2,6,6-pentamethylpiperidine (starting material)

132.5 parts of acrylonitrile are added dropwise to 170 parts of 1,2,2,6,6-pentamethyl-4-aminopiperidine. After stirring for 3 hours at 70° C., the mixture is fractionated in vacuo, giving 180 parts of 4-(β-cyanoethyl)-amino-1,2,2,6,6-pentamethylpiperidine boiling at 115° to 117° C./0.08 Torr.

(b) N-Methoxymethyl-N'-(β-cyanoethyl)-N'-1,2,2,6,6-pentamethylpiperidine-4-yl)-urea (Compound according to the invention)

A partially crystalline mass is obtained in a substantially quantitative yield by reacting methoxymethyl isocyanate with 44.6 parts of 4-(β-cyanoethyl)-amino-1,2,2,6,6-tentamethylpiperidine in the same was as described in Example 23(b) and distilling off the solvent.

EXAMPLE 28

Bis-methoxymethyl urea stabiliser corresponding to the formula

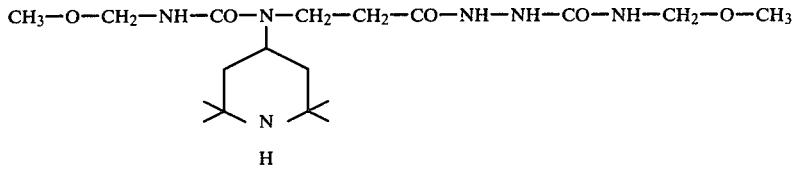

36.3 parts of β-(2,2,6,6-tetramethylpiperidine-4-yl)amino-propionic acid hydrazide are dissolved in 100 parts of toluene, followed by the dropwise addition of 28.2 parts of 93% methoxymethyl isocyanate. After stirring for 1 hour at 25° C., the deposit is filtered off under suction. The filter residue is stirred with 300 parts of petroleum ether and refiltered under suction. 48 parts of colourless crystals melting at 62° to 65° C. are left after drying.

$C_{18}H_{36}H_6O_5$ (416.5).

EXAMPLE 29

(a) 15.6 parts of 4-amino-2,2,4,4-tetramethylpiperidine dissolved in 293 parts of ethanol are added dropwise over a period of 100 minutes to a solution, cooled to 5°-10° C., of 21.4 parts of diphenyl carbonate in 427 parts of ethanol, which is then left standing overnight and subsequently heated for 5 hours at 50° to 70° C.

(b) 802 parts of solution (a) containing the phenyl urethane (α),

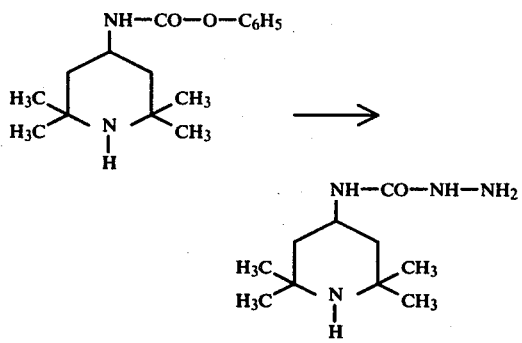

(m.p. 83°-85° C.) (α)→(β) (m.p. 107°-109° C.) are mixed with a solution of 5.62 parts of hydrazine hydrate in 50 parts of ethanol. The resulting mixture is left standing overnight and is then subsequently heated for 3 hours at 50° to 60° C. Removal of the solvent by distillation leaves an oily residue which quickly crystallises out. After dissolution in benzene and precipitation with petroleum ether, the substance crystallises. Softening range: 93° to 98° C., m.p. after recrystallisation from boiling water: 107° to 109° C.

(c) Stabiliser according to the invention containing terminal methylol ether groups:

0.87 part of methoxymethyl isocyanate in 12 parts of dimethyl formamide are added dropwise to 2.14 parts of the semicarbazide (β) dissolved in 15 parts of dimethyl formamide.

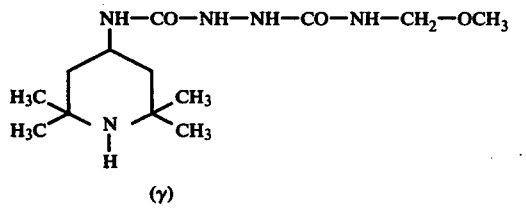

(d) Stabilisation:

2% by weight of the stabiliser γ (as solution c), based on solids) are mixed with an elastomer solution produced in the same way as in Example 18, the solution is cast into films (drying 100° C./130° C.) and the films thus produced are Fadeometer-tested. The stabilisation obtained is substantially identical with the stabilisation according to Example 18(c); it is similarly resistant to extraction.

EXAMPLE 30

(a) 17.0 parts of 4-amino-1,2,2,6,6-pentamethylpiperidine, dissolved in 300 parts of ethanol, are added dropwise over a period of 100 minutes at 5° to 10° C. to a solution of 21.4 parts of diphenyl carbonate in 527 parts of ethanol, followed by heating for 5 hours at 50° to 70° C. (A sample crystallises from petroleum ether with a melting point of 122° to 125° C.).

(b) 815 parts of solution (a), containing the phenyl urethane (δ), are mixed with a solution of 5.65 parts of hydrazine hydrate in 50 parts of ethanol. The resulting mixture is left standing overnight and is then heated for 3 hours at 60° C.

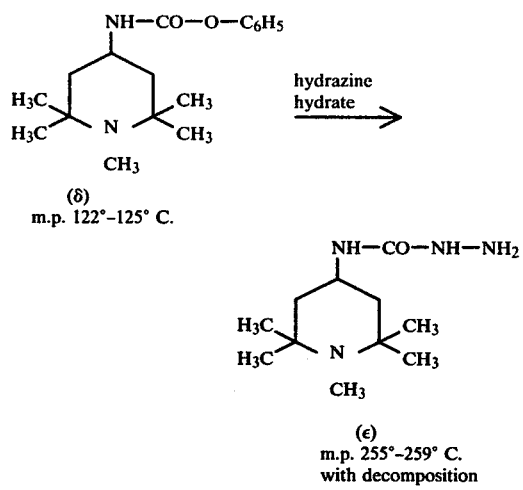

(c) 2.28 parts of the 1,2,2,6,6-pentamethylpiperidinone-4-semi-carbazide (ε) are dissolved in 15 parts of dimethyl formamide, followed by the addition of 0.87 part of methoxymethyl isocyanate in 13.35 parts of dimethyl formamide. The solution of the methylol ether derivative formed (τ)

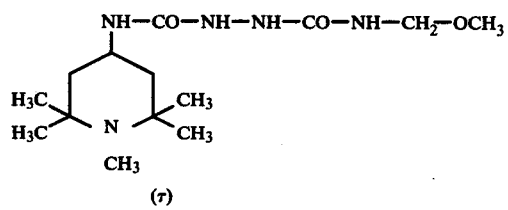

is directly used for stabilisation.

(d) Stabilisation:

2% by weight of the stabiliser (as solution c, based on solids) are mixed into an elastomer solution produced in the same way as in Example 18, and the solution is dried to form films (film drying 30 minutes at 100° C./130° C.). The stabilisation obtained is resistant to extraction and is substantially equal in its effectiveness to the stabilisation obtained with the N-H-piperidine derivative (γ) of Example 29.

EXAMPLE 31

(a) NCO-prepolymer formation 1000 parts of a polytetramethylene ether diol (molecular weight 2000), 18.9 parts of N-methyl-bis-(β-hydroxypropyl)-amine, 246.1 parts of diphenyl methane-4,4'-diisocyanate and 317 parts of dimethyl formamide are heated at 40° to 45° C. until the NCO-content amounts to 2.265% (based on solids).

(b) Chain extension with β-semicarbazidopropionic acid hydrazide (Comparison Example)

7.47 parts of β-semicarbazidopropionic acid hydrazide, dissolved in 15 parts of water, and 541 parts of dimethyl formamide are stirred with 215 parts of the NCO-preadduct solution according to (a) and pigmented with 4% of TiO$_2$ (based on solids). A viscous solution (600 Poises/$\eta_i$=1.01) is obtained.

(c) Addition according to the invention of the attachable stabiliser according to Example 23(b)

1.0% by weight (based on solids) of the stabiliser according to Example 23(b) is added to solution (b). Films are cast from solutions (b) and (c) (drying for 60 minutes at 100° C.).

The films are Fadeometer tested for 22, 44, 88, 110, 132 and 154 hours both in their original state and after extraction for 1 hour with perchlorethylene at 50° C. Whereas the stabiliser-free film (b) is yellow and has retained less than 15% of its original strength after only 22 hours, the stabilised film (c) remains colourless and retains its strength for up to 154 hours, being fully elastic and free from surface cracks after stretching. The stabilising effect is not eliminated by treatment with perchlorethylene. The stabilising effect of the derivatives methylated on the piperidine nitrogen (R=CH$_3$) is substantially equal to the stabilising effect of the derivatives unsubstituted on the piperidine (R=H).

Additions of 1% of the stabilisers according to Examples 24(b), 25(b), 26(b) and 27(b) produced as good and as extraction-resistant a stabilising effect as the stabiliser 23(b) in film (c).

When 1% by weight of the stabiliser according to Example 28 is added and the film is heated at 130° C., the films obtained are again effectively stabilised, but are insoluble in dimethyl formamide and are particularly suitable for coatings, for example.

What we claim is:

1. A permanently stbilised polymer having stabilising radicals attached to O- or N-atoms said radicals corresponding to the general formula (I-A):

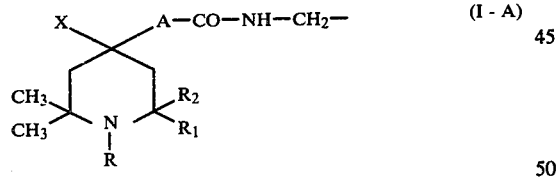
(I - A)

in which

R represents hydrogen, a straight-chain or branched alkyl radical with 1 to 20 carbon atoms, an alkenyl radical with 3 to 5 carbon atoms, an aralkyl radical with 7 to 12 carbon atoms, the group —CH—CHR$_6$—OH, where R$_6$ is hydrogen, methyl or phenyl, the group —CH$_2$—CH$_2$—CN, the group —CH$_2$—CH$_2$COOalkyl or the group

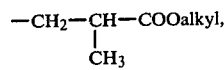

R$_1$ and R$_2$, which may be the same or different, each represents a straight-chain or branched alkyl radical with 1 to 6 carbon atoms or R$_1$ and R$_2$, together with the ring carbon atom to which they are attached, form a cycloalkyl ring with 5 to 7 carbon atoms, —A— represents (a) 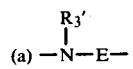

(b) —O—E—, or (c) —CO—NH—NH—;

in case (a), X in the general formula (I-A) represents hydrogen, in case (b), X represents hydrogen, the cyano group or a —COOR$_7$-group where R$_7$ is a methyl or ethyl radical, and in case (c), X represents the OH-group and R$_3$' represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonylethyl radical with 1 to 3 carbon atoms in the alkoxy moiety, an aryl radical with 6 to 10 carbon atoms, the group —CH$_2$—CH (R$_6$)—OH (in which R$_6$ represents hydrogen, methyl or phenyl), the group:

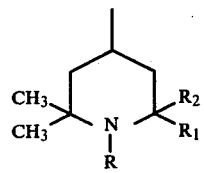

the group:

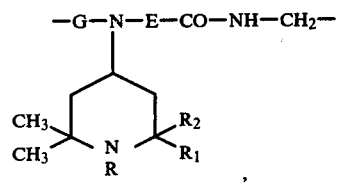

where G is an alkylene group with 2 to 6 carbon atoms, an aralkylene group with 8 to 10 carbon atoms or an arylene group with 6 to 8 carbon atoms, or the group:

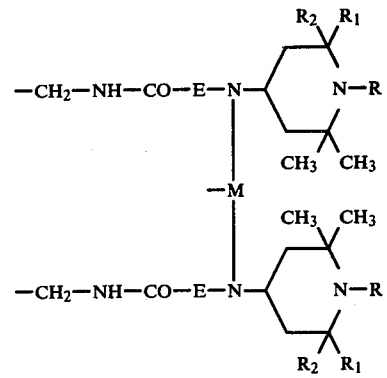

or the group —E—CO—NH—CH$_2$— where M represents an alkane triyl group with 5 or 6 carbon atoms or an aralkane triyl group with 9 carbon atoms and where E represents a C$_1$ to C$_3$-alkylene radical, the group —CH$_2$—CH(R$_6$)—O— (where R$_6$ is as defined above), the group —(CH$_2$)$_3$—NH—, the group —C$_1$ to C$_3$-alkylene—CO—NH—, the group —C$_1$ to C$_3$-alkylene —CO—NH—NH— or the group —CO—NH—NH or a single bond, the radical —CO—NH—CH$_2$— never being directly attached twice to the nitrogen atom in formula (a).

2. A permanently stabilised polymer as claimed in claim 1, wherein the polymer contains from 0.05 to 5% by weight, based on the total weight, of stabilising radicals of the formula (I-A) defined in claim 1.

3. A permanently stabilised polymer as claimed in claim 1, wherein the stabilising radical corresponds to the general formula (II-A):

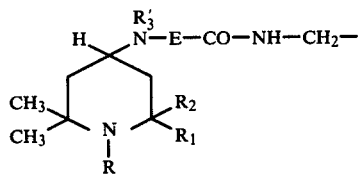
(II-A)

in which

R, R$_1$, R$_2$, R$_3'$ and E are as defined in claim 1.

4. A permanently stabilised polymer as claimed in claim 1, wherein the stabilising radical corresponds to the general formula (III-A):

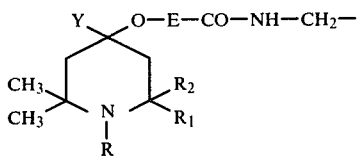
(III-A)

in which

R, R$_1$, R$_2$ and E are as defined in claim 1, and

Y represents hydrogen, the cyano group or a COOR$_7$- group in which R$_7$ is a methyl or ethyl radical.

5. A permanently stabilised polymer as claimed in claim 1, wherein the stabilising radical corresponds to the general formula (IV-A):

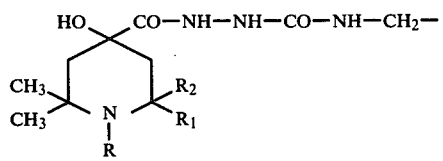
(IV-A)

in which

R, R$_1$ and R$_2$ are as defined in claim 1.

6. A permanently stabilised polymer as claimed in claim 1, wherein the polymer is a polyurethane.

7. A permanently stabilised polymer as claimed in claim 1, wherein the polymer is a polyamide.

8. A permanently stabilised polymer as claimed in claim 1, wherein the polymer is a polycarbonate.

9. A permanently stabilised polymer as claimed in claim 1, wherein the polymer is an ethylene-vinylacetate copolymer of which the acetate groups are completely or partially hydrolysed.

10. Shaped articles comprising a permanently stabilized polymer as claimed in claim 1.

* * * * *